US006057995A

United States Patent [19]
Yamashita et al.

[11] Patent Number: 6,057,995

[45] Date of Patent: *May 2, 2000

[54] DISC CARTRIDGE WITH APERTURE FOR ACCESS TO DISC PROVIDED WITH SHUTTER ARRANGED FOR MINIMIZING OVERALL SIZE OF CARTRIDGE

[75] Inventors: Keitaro Yamashita; Tomihiro Nakagawa, both of Kanagawa; Sakae Imaizumi, Saitama; Keisuke Tejima, Tokyo, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/826,892

[22] Filed: Apr. 9, 1997

Related U.S. Application Data

[62] Division of application No. 08/493,697, Jun. 22, 1995, abandoned.

[30] Foreign Application Priority Data

Jun. 29, 1994 [JP] Japan .................................... 6-148382

[51] Int. Cl.[7] .................................................... G11B 23/03

[52] U.S. Cl. ............................................ 360/133; 369/291

[58] Field of Search .................................... 360/133, 132; 369/291

[56] References Cited

U.S. PATENT DOCUMENTS

| | | | |
|---|---|---|---|
| 3,416,150 | 12/1968 | Lindberg, Jr. | 360/97.02 |
| 3,529,301 | 9/1970 | Hiruta | 360/99.12 |
| 4,482,929 | 11/1984 | Beck et al. | 360/133 |
| 4,609,963 | 9/1986 | Conner et al. | 360/133 |
| 4,613,044 | 9/1986 | Saito et al. | 360/133 |
| 4,644,434 | 2/1987 | Oishi et al. | 360/133 |
| 4,860,128 | 8/1989 | Nakagawa | 360/133 |
| 4,866,697 | 9/1989 | Yamaguchi et al. | 360/133 |
| 5,367,422 | 11/1994 | Fujisawa et al. | 360/133 |

FOREIGN PATENT DOCUMENTS

| | | |
|---|---|---|
| 0 086 395 | 8/1983 | European Pat. Off. . |
| 0 332 214 | 9/1989 | European Pat. Off. . |
| 0 335 461 | 10/1989 | European Pat. Off. . |
| 0 358 269 | 3/1990 | European Pat. Off. . |
| 0 368 416 | 5/1990 | European Pat. Off. . |
| 0 411 670 | 2/1991 | European Pat. Off. . |
| 0 463 575 | 1/1992 | European Pat. Off. . |
| 0 472 443 | 2/1992 | European Pat. Off. . |
| 0 496 511 | 7/1992 | European Pat. Off. . |
| 0 506 054 | 9/1992 | European Pat. Off. . |
| 2 191 189 | 2/1974 | France . |
| 27 17 689 | 10/1978 | Germany . |

*Primary Examiner*—David Davis
*Attorney, Agent, or Firm*—Frommer Lawrence & Haug, LLP.; William S. Frommer

[57] ABSTRACT

A disc cartridge having a disc-shaped recording medium, such as an optical disc or a magneto-optical disc, rotatably housed within a main cartridge body. The disc cartridge has a main cartridge body made up of an upper cartridge half and a lower cartridge half, and a disc-shaped recording medium rotatably accommodated within the main cartridge body. A recording and/or reproducing aperture is formed in at least one of major surfaces of the main cartridge body. A shutter is mounted for movement along a sidewall section of the main cartridge body between a position closing the aperture and a position closing the aperture. There is provided an inclined portion in the aperture inclined with respect to the inserting direction of the disc cartridge.

10 Claims, 21 Drawing Sheets

30 35 39 40 42 43 46 37 41 45 47

DISC CARTRIDGE WITH APERTURE FOR ACCESS TO DISC PROVIDED WITH SHUTTER ARRANGED FOR MINIMIZING OVERALL SIZE OF CARTRIDGE

This application is a division of application Ser. No. 08/493,697, filed Jun. 22, 1995, abandoned.

BACKGROUND OF THE INVENTION

This invention relates to a disc cartridge having a disc-shaped recording medium, such as an optical disc or a magneto-optical disc, rotatably housed within a main cartridge body.

There has hitherto been proposed a recording disc for recording desired information signals, such as an optical disc or a magneto-optical disc. Such recording disc is usually handled as a disc cartridge in which the disc is accommodated within a main cartridge body in order to facilitate handling or to prohibit dust and dirt from becoming attached to the recording medium.

Such known disc cartridge has a main cartridge body 103 formed by abutting an upper cartridge half 101 and a lower cartridge half 102 to each other and a recording disc 104 rotatably accommodated in the main cartridge body, as shown in FIGS. 1 and 2.

There is formed in the main cartridge body 103 a rectangular-shaped aperture 105 for recording/reproduction of signals on the disc 104 by means of an optical unit or a magnetic head having access thereto through the aperture 105. This aperture 105 extends in a direction perpendicular to the cartridge inserting direction indicated by arrow Y in FIG. 1 and may be opened or closed by a shutter 106 formed e.g., from a metal sheet or the like. The aperture 105 remains closed except during recording/reproduction. The shutter 106 is opened by a shutter opening member provided in the recording/reproducing apparatus. The techniques pertinent thereto were proposed by the present Assignee in two US patent publications which matured as U.S. Pat. Nos. 5,272,693 and 5,367,422.

The size of the disc cartridge is determined not only by the size of the recording disc 104 but also by the size of the shutter 106 and the size of the aperture 105 which in turn are determined by the range of movement of an optical pickup 107 enclosed within the recording/reproducing apparatus between the inner most position X1 on the disc 104 and the outer most position X2 on the disc). That is, the size of the disc cartridge is determined by the size of the aperture 105 and the arrangement of the shutter 106. For example, in the case of the recording disc 104 with a diameter of 120 mm, the disc cartridge has a width W1 of 130 mm and a width W2 of 135 mm in the disc inserting direction and in the direction perpendicular thereto, respectively.

Once the size of the disc cartridge is determined, the size of the recording/reproducing apparatus accommodating the disc cartridge is determined unequivocally therefrom. Thus the recording/reproducing apparatus may be reduced in size by reducing the size of the disc cartridge.

Although the disc cartridge may be reduced in size by arranging part of the optical pickup 107 outside of the main cartridge body 103, the recording/reproducing apparatus itself is unchanged in size and cannot be reduced in size. For reducing the size of the disc cartridge, it is necessary to attempt this in connection with the recording/reproducing apparatus.

The disc cartridge is provided with a mistaken insertion prohibiting mechanism for prohibiting insertion of the disc cartridge into the recording/reproducing apparatus in case it is attempted to introduce the disc cartridge in a mistaken direction into the recording/reproducing apparatus. Such a mistaken insertion prohibiting mechanism has been proposed in which a mistaken insertion prohibitive member adapted for being engaged in one or more grooves formed in the side wall or the bottom plate of the main cartridge body is provided in the recording/reproducing apparatus.

However, if the groove(s) for prohibiting mistaken insertion is provided in the main cartridge body, a redundant space is required for providing the groove(s). Above all, in a disc cartridge required to be reduced in thickness, limitations are placed on the width or depth of the groove(s) that can be provided thus imposing strict mounting precision on mistaken insertion prohibiting components provided in the recording/reproducing apparatus. The disc cartridge tends to be poor in strength and hence cannot withstand a large external force. In addition, provision of the groove(s) occasionally leads to surface irregularities giving rise to collision with the recording/reproducing apparatus or with the disc cartridge being introduced into the apparatus.

On the other hand, the disc cartridge needs to be loaded at a pre-set loading position in the recording/reproducing apparatus in connection with the facing distance or relative disposition between the recording disc on one hand and the optical pickup or the magnetic head on the other hand.

To this end, the disc cartridge has cartridge positioning holes for receiving a pair of positioning pins provided in the recording/reproducing apparatus. The positioning pins are engaged in the cartridge positioning holes for setting the fore-and-aft and left-and-right position of the disc cartridge and the height level of the disc cartridge with respect to the recording/reproducing apparatus.

However, as for the reference for the height level, there is no structural difference between actual disc cartridges, although the area in which to provide the cartridge positioning hole is prescribed in the design standards. This results in limitations imposed on surface finishing inclusive of that for a positioning portion, such as satin finishing, thus rendering it difficult to perform slip-proof knurling of a portion gripped by the user.

Furthermore, the height level at which the disc cartridge is secured is also influenced by fluctuations in the outer size of the positioning pins provided in the recording/reproducing apparatus. For example, if the positioning pins are of larger or smaller diameters due to the fluctuations in the machining precision, the height level of the disc cartridge with respect to the recording/reproducing apparatus may be varied due to difference in the contact area between the height setting pins and the disc cartridge.

OBJECTS AND SUMMARY OF THE INVENTION

It is therefore an object of the present invention to provide a disc cartridge which may be reduced in size and which renders it possible to reduce the size of the recording/reproducing apparatus employing the disc cartridge.

It is another object of the present invention to provide a disc cartridge which can be smoothly introduced into recording/reproducing apparatus in a manner free from collision without forming the cartridge body with a groove or grooves for ensuring correct insertion of the disc cartridge in the recording/reproducing apparatus employing such disc cartridge.

It is yet another object of the present invention to provide a disc cartridge which renders it possible to render the reference position for the positioning holes definite and to facilitate distinction between a metal mold portion in need of finishing machining and another metal mold portion not in need of finishing machining and the tolerance of variations in the outer size of the positioning pins.

In one aspect, the present invention provides a disc cartridge having a main cartridge body made up of an upper cartridge half and a lower cartridge half. A disc-shaped recording medium is rotatably accommodated within the main cartridge body, and a recording and/or reproducing aperture is formed in at least one of major surfaces of the main cartridge body. A shutter is mounted for movement along a sidewall section of the main cartridge body between a position closing the aperture and a position exposing the aperture. The aperture is formed with an inclined portion which is inclined with respect to the inserting direction of the disc cartridge.

With the disc cartridge of the present invention, the angle of inclination of the aperture is included between a straight line normal to the movement direction of the shutter and a line passing through the center of a disc-shaped recording medium and is smaller than 45°. The aperture may be desirably substantially V-shaped in plan configuration so as to have oppositely inclined portions through which recording and reproducing devices, respectively, have simultaneous access to the disc-shaped recording medium.

In another aspect, the present invention provides a disc cartridge including a main cartridge body made up of an upper cartridge half and a lower cartridge half. A disc-shaped recording medium is rotatably accommodated within the main cartridge body, and a recording and/or reproducing aperture is formed in at least one of major surfaces of the main cartridge body. An inclined portion is formed in the aperture which is inclined with respect to the inserting direction of the disc cartridge. There are provided two shutters for movement relative to each other and relative to the main cartridge body along a sidewall section of the main cartridge body between a position closing the aperture and a position exposing the aperture.

In still another aspect, the present invention provides a disc cartridge similarly including a main cartridge body made up of an upper cartridge half and a lower cartridge half. A disc-shaped recording medium is rotatably accommodated within the main cartridge body. Both sidewall sections of the main cartridge body extending parallel to and facing each other are of different cross-sectional configurations.

In still another aspect, the present invention provides a disc cartridge similarly including a main cartridge body made up of an upper cartridge half and a lower cartridge half. A disc-shaped recording medium is rotatably accommodated within the main cartridge body. One of the sidewall sections of the main cartridge body extending parallel to and facing each other is of outwardly convex sharply arcuate cross-sectional configuration. The other sidewall section may be of a substantially orthogonally angled U-shaped cross-section.

A disc cartridge insertion opening of a cartridge holder or a disc cartridge insertion opening in the front surface of the apparatus is substantially of the same cross-sectional shape as that of the disc cartridge in its normal inserting direction.

With the disc cartridge according to the present invention, since the aperture through which the disc cartridge is exposed to the optical pickup device is inclined with respect to the inserting direction of the disc cartridge, the aperture may be of an increased width corresponding to the inclination of the aperture, while the disc cartridge may be reduced in size. By the inclined disposition of the optical pickup device facing the aperture, the recording/reproducing apparatus may be reduced in size.

In the disc cartridge according to the present invention, provided with both the optical pickup device for recording and the optical pickup device for reproduction may be caused to face an aperture of a disc cartridge which is substantially V-shaped in planar configuration, information signals may be recorded on a recording disc and reproduced therefrom immediately.

On the other hand, if a disc cartridge is provided with two shutters, and if disc cartridges accommodating recording discs of different diameters are interchangeable, it is necessary to provide a large aperture in a disc cartridge accommodating a small-sized recording disc. However, by constituting the shutter as two shutters, there is no necessity of providing a larger difference in shutter displacement, and there is no risk of the shutter being moved to outside of the main cartridge body. By providing two shutters, information signals may be recorded or reproduced from plural types of disc cartridges accommodating recording discs of different diameters.

By providing the sidewall sections parallel to the direction of insertion into the recording/reproducing apparatus with different cross-sectional configuration, there is no need to form grooves in the main cartridge body. Thus the disc cartridge can be smoothly inserted into and detached from the recording/reproducing apparatus without collision, while mistaken insertion in the incorrect direction may be inhibited positively. Since no grooves are formed in the main cartridge body, planar portions of the main cartridge body, such as its lateral or bottom sides, may be used as a label bonding surface for improving cartridge functions. In addition, the degree of design freedom of junction portions between the upper and lower cassette halves may be increased and the metal mold designing may be facilitated resulting in cost reduction and improved mechanical strength of the main cartridge body.

With the recording and/or reproducing apparatus for loading the disc cartridge, the disc cartridge inserting opening of the apparatus is substantially of the same shape as the cross-sectional shape of the disc cartridge in its normal inserting direction, so that, if the disc cartridge is about to be inserted from a direction different from its normal inserting direction, the disc cartridge can be positively prohibited from being introduced into the disc cartridge inserting opening.

In the disc cartridge according to the present invention, toroidal-shaped grooves are formed about the outer perimeter of disc cartridge positioning holes for definitely setting the position of the reference height plane and facilitating the distinction between a metal mold portion in need of precise machining and a metal mold portion not in need of precise machining as well as allowing for tolerance of variations in the outer dimensions of positioning pins engageable in the respective holes. Thus, it is only necessary to finish the region between each cartridge positioning hole and the respective toroidal- shaped groove formed therearound, while the remaining portions may remain rough as to dimensional accuracy or planarity. On the other hand, the portion of the disc cartridge gripped by a user may be easily machined, for example, as by knurling, so as to be slip-proof.

In addition, by reason of the toroidal-shaped groove formed around each disc cartridge positioning hole, any fluctuations in the outer size of the positioning pin provided in the recording/reproducing apparatus may be absorbed by the toroidal-shaped groove thus allowing the disc cartridge to be positioned highly accurately at a pre-set height and a pre-set position with respect to the recording/reproducing apparatus.

DETAILED DESCRIPTION OF PREFERRED EMBODIMENTS

Figure 1:
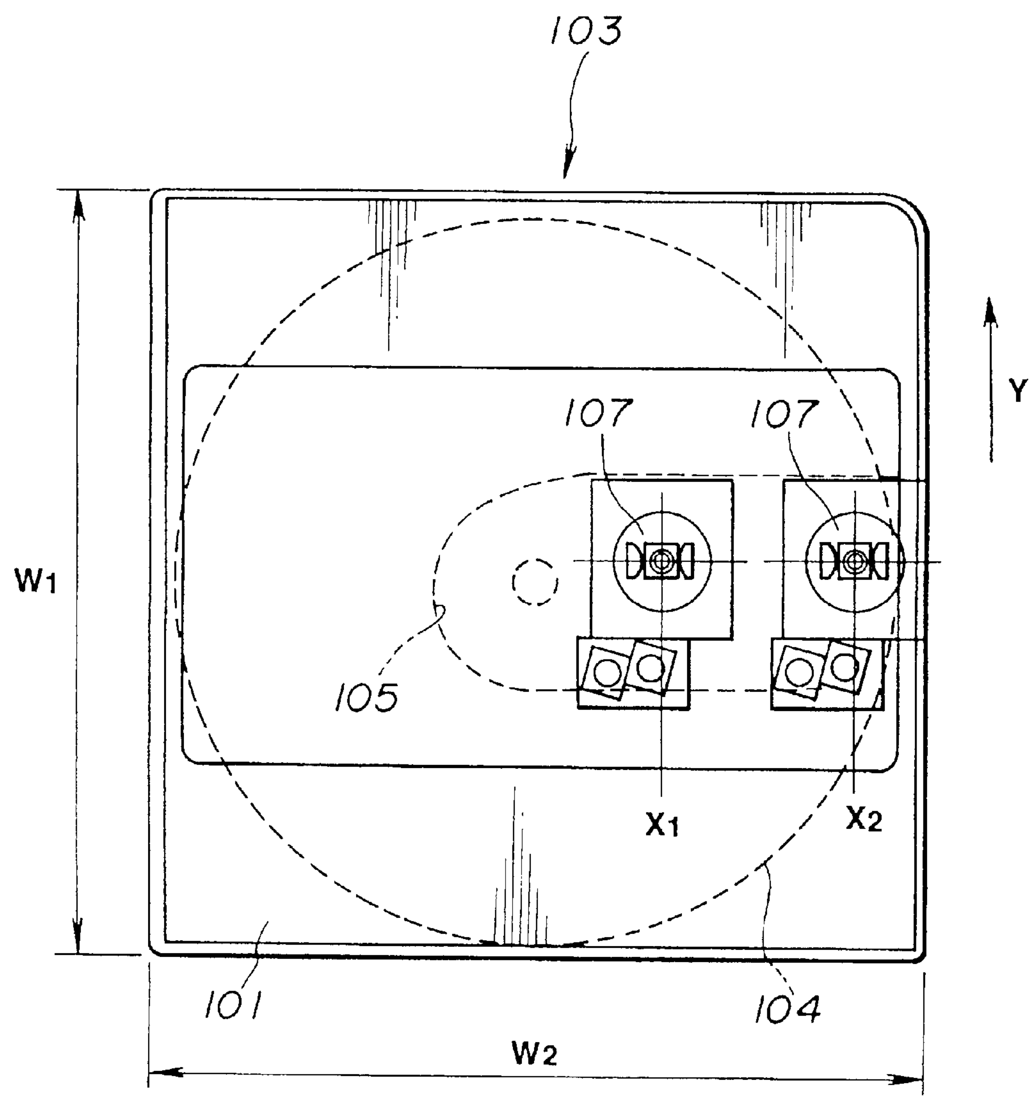
FIG. 1 is a see-through schematic plan view showing the state in which an optical pickup device faces an aperture of a conventional disc cartridge.
Figure 2:
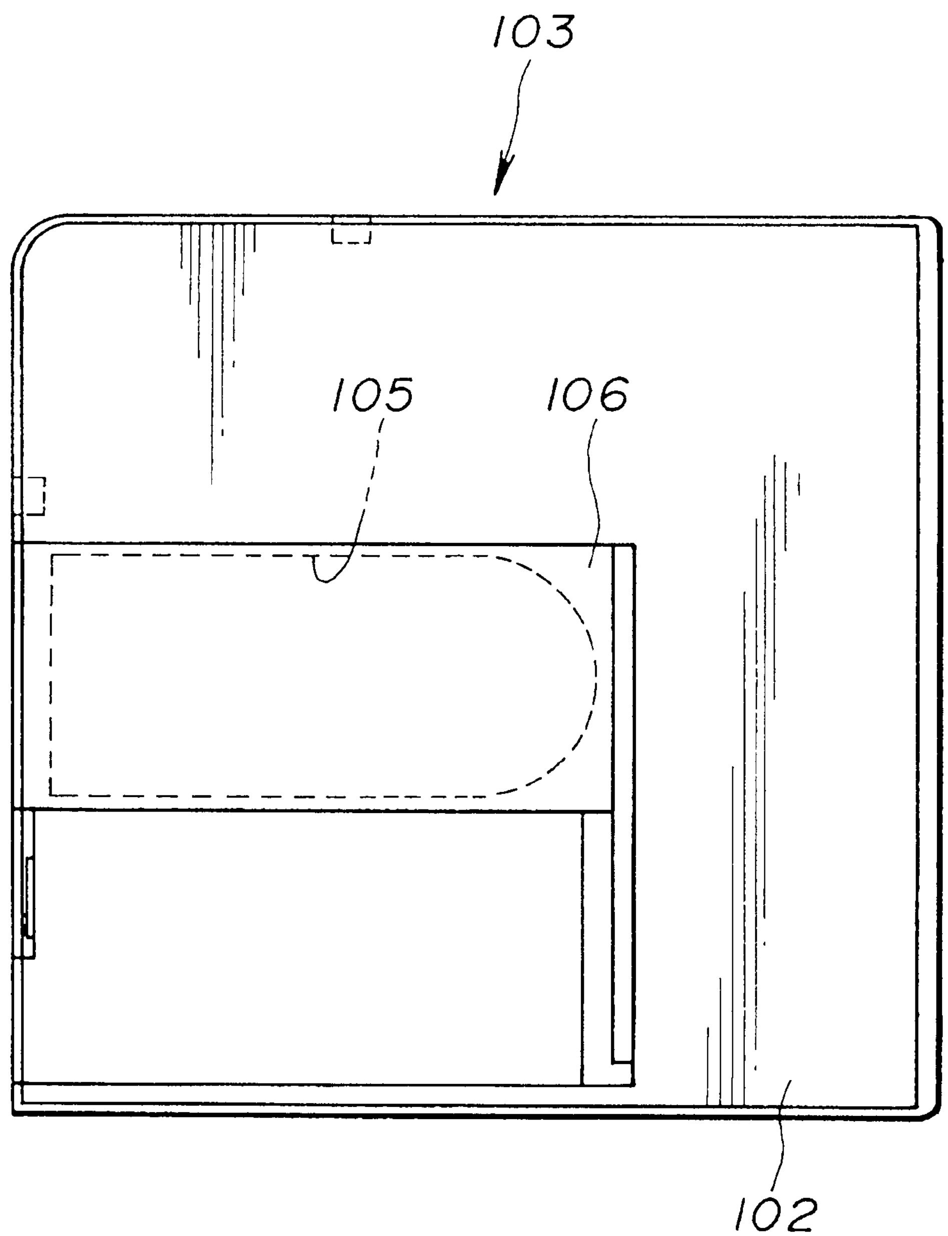
FIG. 2 is a bottom view of the conventional disc cartridge of FIG. 1, showing a shutter thereof in its closed position.

Referring to the drawings, preferred illustrative embodiments of a disc cartridge according to the present invention will now be explained in detail.

Figure 3:
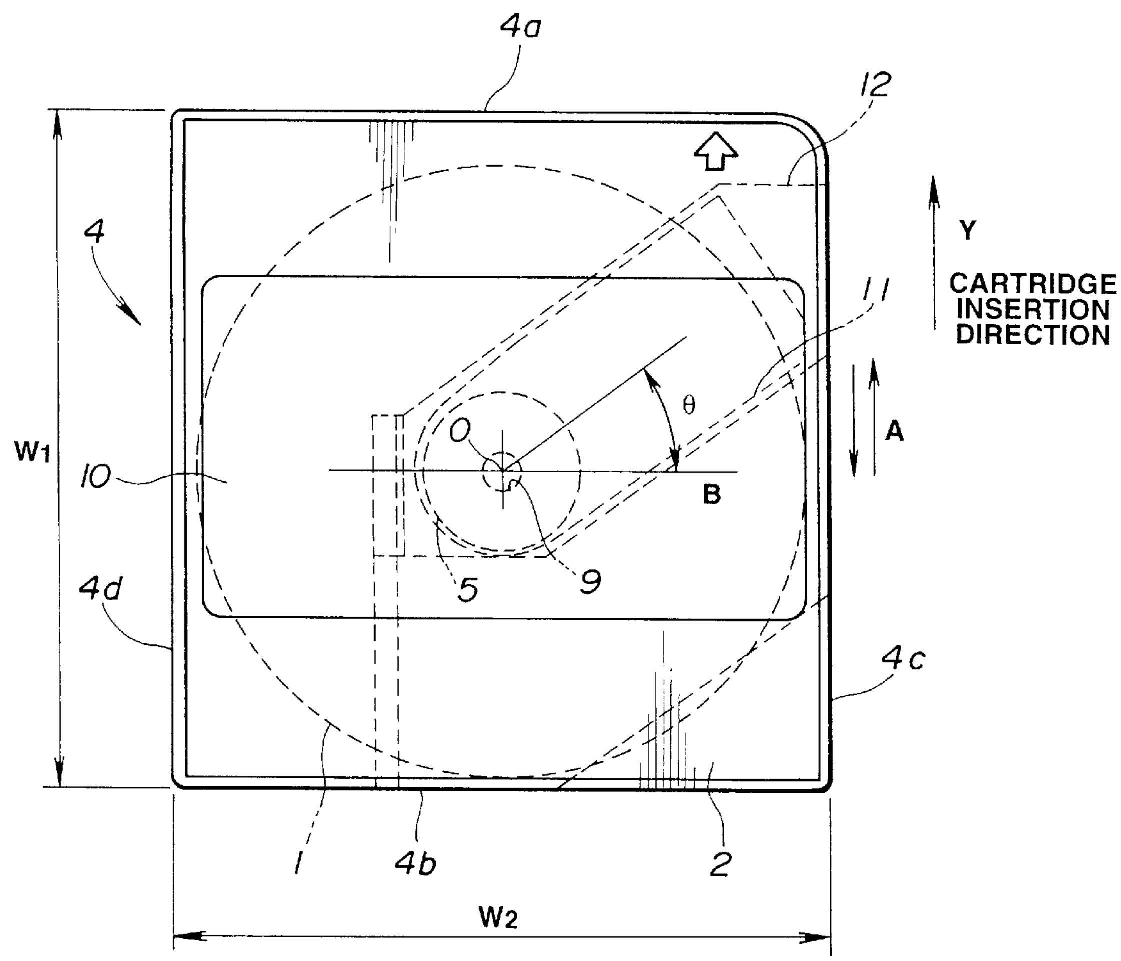
FIG. 3 is a plan view showing a disc cartridge according to a first embodiment of the invention, and which is shown with its shutter in is closed position.
Figure 4:
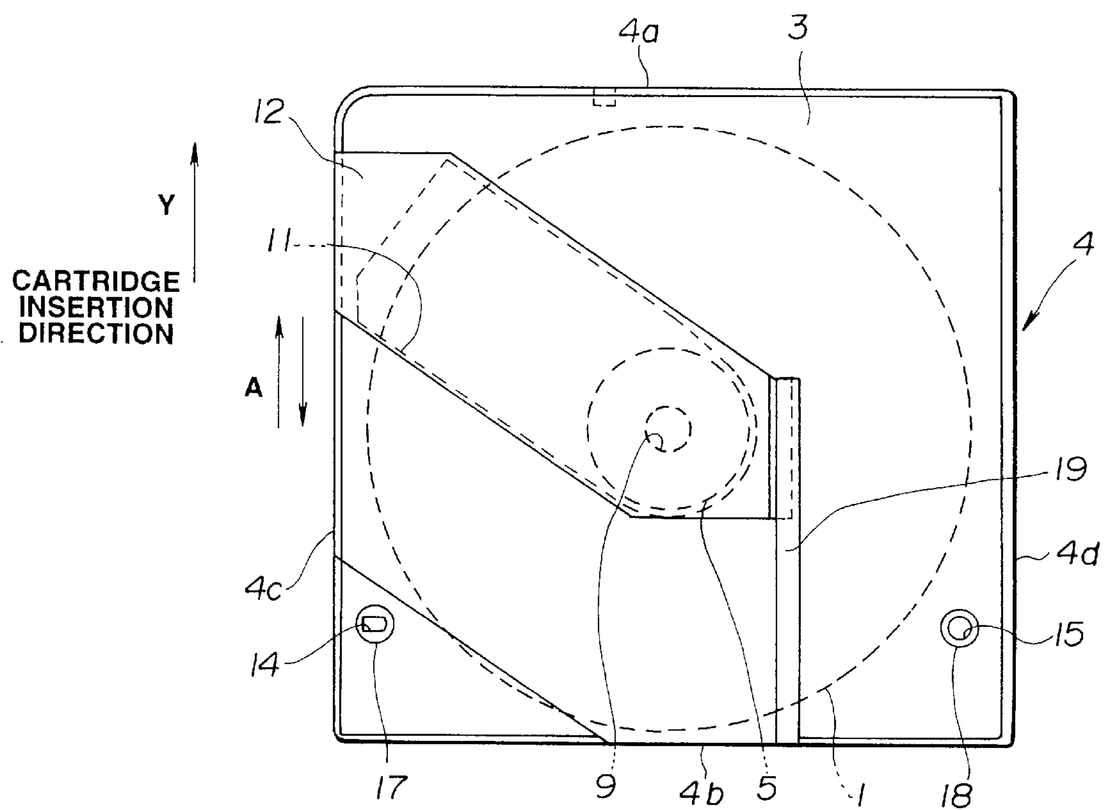
FIG. 4, is a bottom view of the disc cartridge of FIG. 3.

A disc cartridge according to a first embodiment is shown on FIGS. 3 and 4 to be generally characterized by an access aperture arranged substantially on a diagonal line of a generally rectangular main cartridge body.

Figure 6:
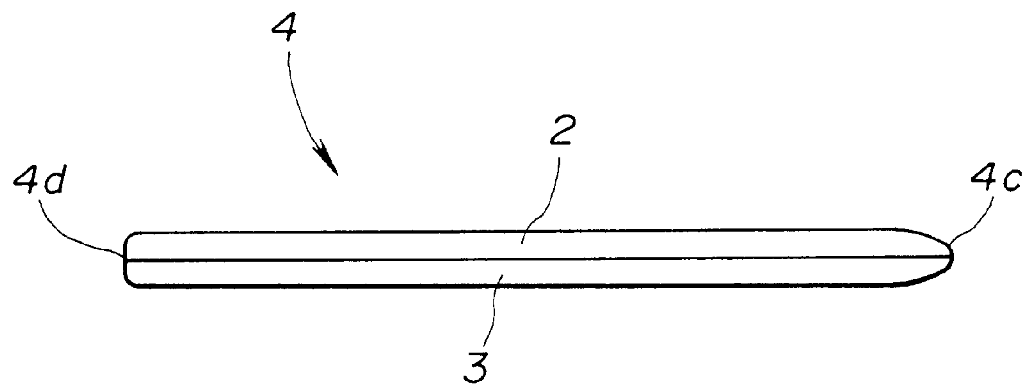
FIG. 6 is a front view of the disc cartridge of FIG. 3.

More specifically, the disc cartridge has a recording disc 1, as a disc-shaped recording medium, and a main cartridge body 4 made up of an upper cartridge half 2 and a lower cartridge half 3 for rotatably accommodating the recording disc 1, as shown in FIGS. 3 and 6.

Figure 9:
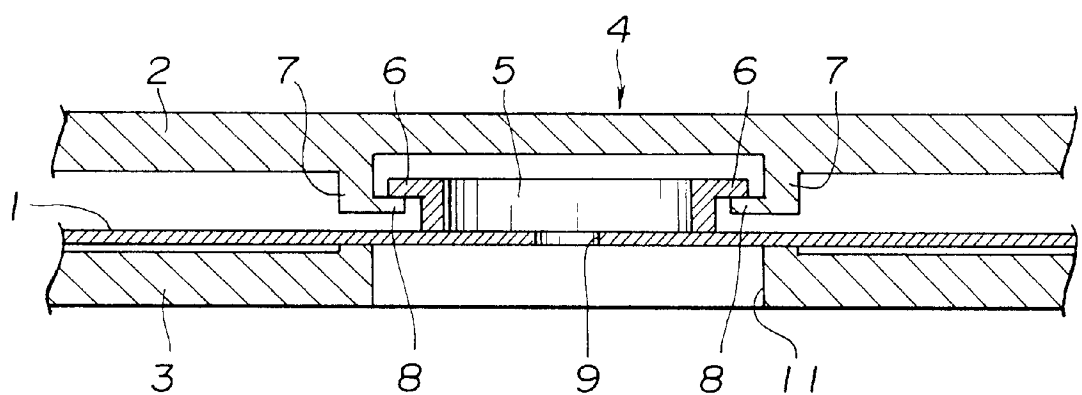
FIG. 9 is a schematic enlarged cross-sectional view showing the positioning of the recording disc within the cartridge body in the disc cartridge according to the first embodiment.

The recording disc 1 is exemplified by an optical disc, a magneto-optical disc or a magnetic disc. Such recording disc 1 has a chuck hub 5 of a metallic material at its center, as shown in FIG. 9. The chuck hub is magnetically attracted by a spindle constituting a disc rotating driving mechanism to cause the recording disc 1 to be rotated within the inside of the main cartridge body 4.

The chuck hub 5 is formed in a disc shape by working a metal sheet and has a toroidally-shaped flange 6 at an upper outer rim thereof. This flange 6 is supported by a retainer 8 formed on the outer rim of a cylindrical rib 7 formed in the inner wall surface of the upper cartridge half 2 for being protruded into the inside of the main cartridge body 4. During the time other than the recording/reproducing time, the flange 6 is supported by the retainer 8 and, during the recording/reproducing time, the recording disc 1 is lifted by the spindle to annul the state of engagement between the flange and the retainer.

Figure 5:
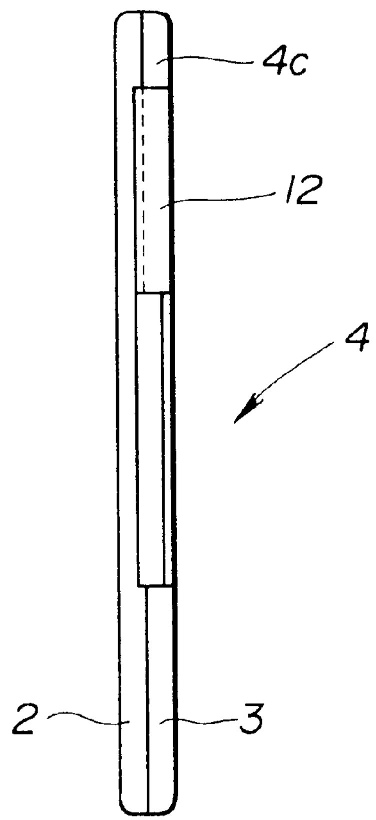
FIG. 5 is a side view of the disc cartridge of FIG. 3.

The recording disc 1 has a center opening 9 passed through by a centering pin, not shown, which is provided at the center of the spindle. The center opening 9 is a small-sized circular through-hole extending through the thickness of the recording disc 1. The main cartridge body 4 is made up of rectangular-shaped upper and lower cartridge halves 2 and 3 dimensioned to be large enough to rotatably accommodate the recording disc 1, as shown in FIGS. 5 and 6. These upper and lower cartridge halves are abutted to each other to constitute a thin casing. The major surface of the upper cartridge half 2 has a label surface 10 for printing or bonding a label, as shown in FIG. 3.

Figure 7:
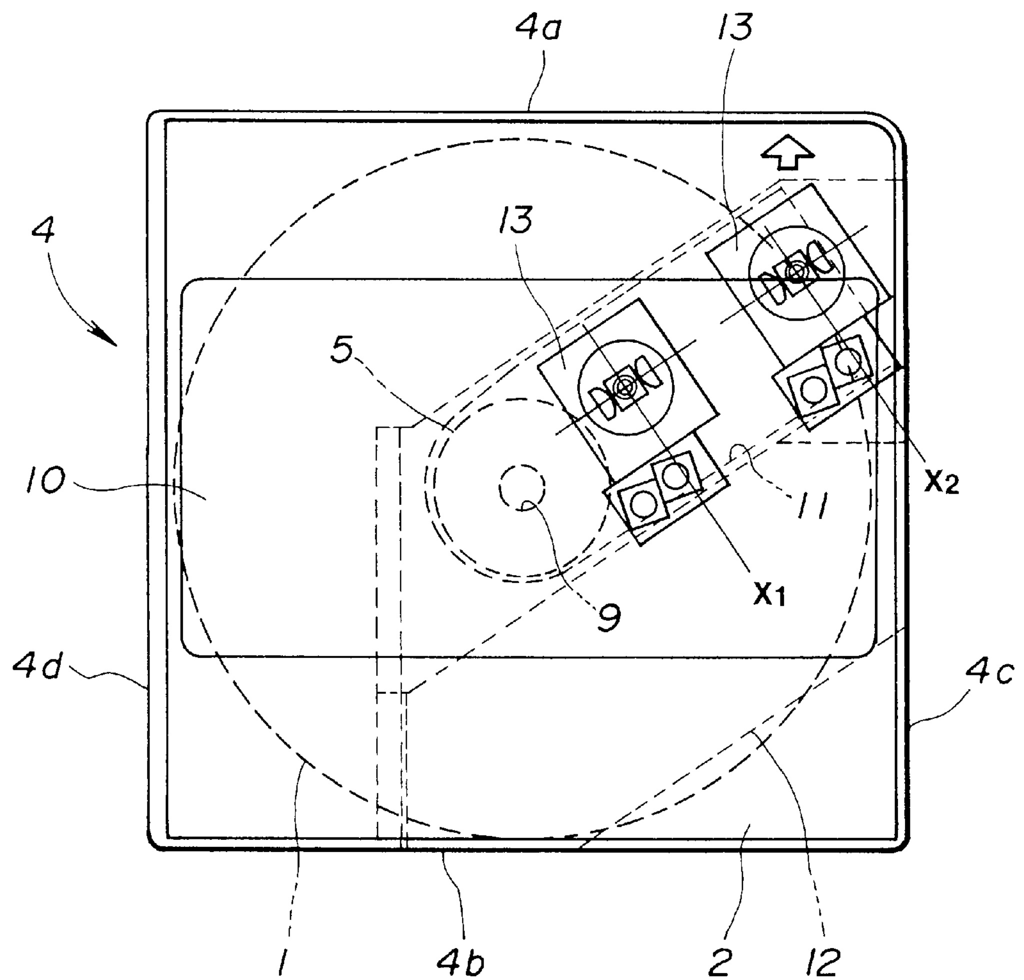
FIG. 7 is a see-through view showing the disc cartridge of FIG. 3 with its shutter in the opened position and with the optical pickup device facing the aperture.

The major surface of the lower cartridge half 3 has an access aperture 11 which is faced by a disc rotating driving means and an optical pickup device 13, enclosed within the recording/reproducing apparatus, as shown in FIG. 7. The aperture 11 is configured and dimensioned so as to be elongated and large enough to be faced by at least the disc rotating and driving means and the optical pickup and is formed with its longitudinal axis at an angle relative to the cartridge inserting direction indicated by arrow Y in FIG. 3, beginning from the center of the recording disc 1. That is, the elongated aperture 11 has its longitudinal axis passed through the center 0 of the recording disc 1 and inclined at an angle θ smaller than 45° with respect to a straight line B perpendicular to the movement direction of the shutter 12 indicated by arrow A in FIG. 3.

The angle of inclination θ of the aperture 11 is set so as to be smaller than 45° in order to reduce the size of the disc cartridge while maintaining the maximum window opening space, as shown in FIG. 3. Although inherently the angle of inclination θ of 45° is desirable, an the angle less than 45° may be actually more desirable in view of the size and amount of displacement of the shutter 12 or the size of the optical pickup device.

If the aperture 11 is inclined in this manner, the aperture 11 may be selected to be larger, in an amount determined by the angle θ, than the aperture of the known disc cartridge of the same shape shown in FIG. 1 extending in a direction perpendicular to the cartridge inserting direction. Stated differently, the disc cartridge itself may be decreased in an amount corresponding to the angle θ for the same size of the aperture 11.

In this case as shown in FIG. 7, if the optical pickup device 13 is moved between an inner most radial position X1 and an outer most radial position X2 of a recording/reproducing area in the recording disc 1, there is no risk of the optical pickup device 13 being moved to outside the main cartridge body 4. That is, the recording/reproducing apparatus as well as disc cartridge may be reduced in size.

For the disc having a diameter of 120 mm, the outer size of the known disc cartridge 1 of FIG. 1 of W1=130 mm and W2=135 mm, as mentioned hereinabove, whereas, for the same disc, the outer size of the disc cartridge of the present embodiment is W1=130 mm and W2=130 mm. That is, by employing the inclined aperture 11, the width W2 in a direction perpendicular to the cartridge inserting direction may be reduced by as much as 5 mm.

The lower cartridge half 3 has a pair of disc cartridge positioning holes 14, 15 for setting the loading position of the disc cartridge with respect to the recording/reproducing apparatus, as shown in FIG. 4. The disc cartridge positioning holes 14, 15 are provided towards a lateral sidewall section **4*b* opposite to a lateral sidewall section 4*a* which is the leading side as the disc cartridge is inserted, and are elongated and circular in cross-section, respectively. The holes 14, 15 are so contoured for absorbing an error in the distance between the cartridge positioning holes 14, 15** relative to the distance between the positioning pins of the recording/reproducing apparatus or relative changes in such distances caused by ambient temperature.

Figure 10A:
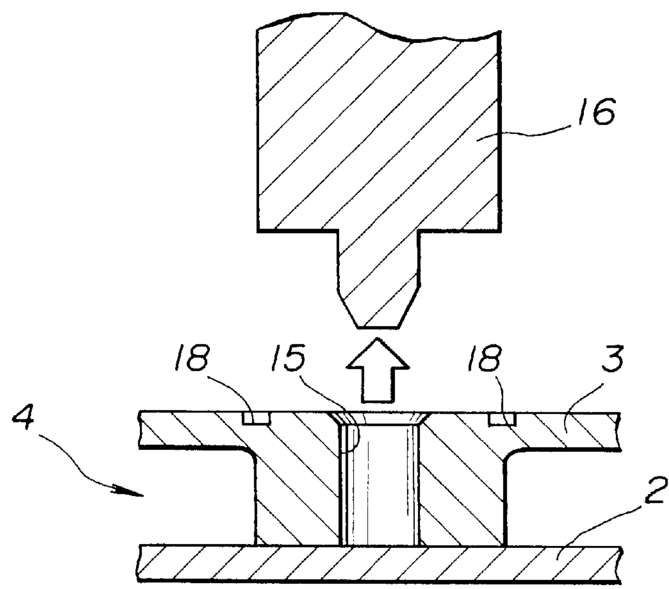
FIGS. 10A to 10C are schematic enlarged cross-sectional views Showing the inter engagement of a positioning pin and a cartridge positioning hole in the disc cartridge of FIG. 3.
Figure 10B:
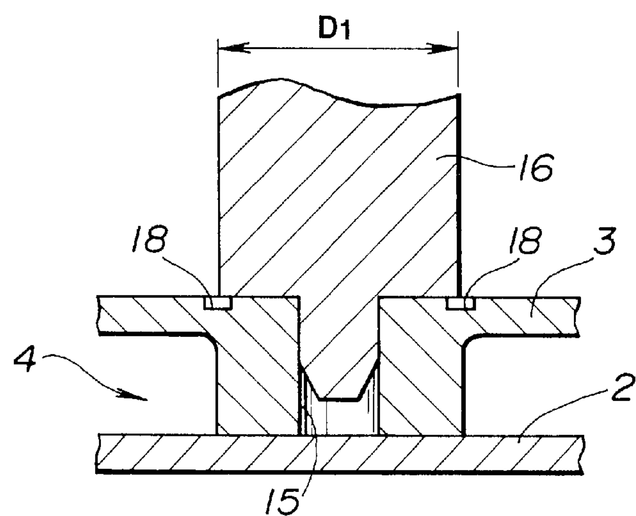

These positioning holes 14, 15 are adapted to be each engaged by a respective positioning pin 16 provided in the recording/reproducing apparatus, as shown in FIG. 10A with respect to the hole 15. The loading position of the disc cartridge with respect to the recording/reproducing apparatus is determined by the positioning pins 16 engaged in the positioning holes as shown in FIG. 10B.

The positioning pins 16 also perform the role of setting the height level of the disc cartridge with respect to the recording/reproducing apparatus. Thus the portion of the disc cartridge contacted with the positioning pins 16 serves as the reference height plane and hence needs to be an extremely planar surface as compared to other portions. In the present embodiment, toroidal-shaped grooves 17, 18 are formed around the outer perimeter of the disc cartridge positioning holes 14, 15 for definitely setting the position of the reference height plane and facilitating the distinction between a metal mold portion in need of precise finishing machining and a metal mold portion not in need of precise finishing machining, as well as allowing for the tolerance of the outer shape of the positioning pin 16.

Figure 10C:
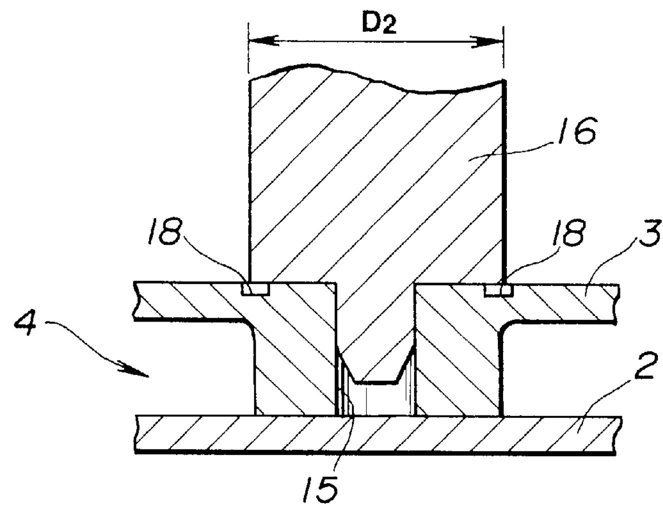

These grooves 17, 18 are formed at such positions in which the outer edge of the respective positioning pin 16 is within the range of the groove 17 or 18 both when the outer size of the positioning pin 16 is at the minimum end of dimensional tolerance, with the diameter of the pin 16 being then D1 (FIG. 10B), and when the outer size of the positioning pin 16 is at the maximum end of dimensional tolerance, with the diameter of the pin 16 being then D2 (FIG. 10C). That is, the positioning pin 16 is configured to be contacted only with the toroidal-shaped height reference plane between the disc cartridge positioning holes 14, 15 and the grooves 17, 18 defined around the holes 14, 15.

By forming the grooves 17, 18 around the outer peripheral portions of the disc cartridge positioning holes 14, 15, the position of the reference height plane can be clearly set, while demarcation between the areas of the metal mold which require precise finish machining and the areas which do not need to be precise can be set. The result is that only the portion of the metal mold corresponding to the reference height plane needs to be machined with high precision while the remaining portion needs to be machined only roughly. In addition, since the grooves 17, 18 are formed within the range of the dimensional tolerance of the outer size of the positioning pin 16, there is no risk of the positioning pin 16 being contacted with portions other than the reference height plane, thus allowing the disc cartridge to be positioned at a precisely set height position.

The main cartridge body 4, made up of the upper cartridge half 2 and the lower cartridge half 3, is provided with a shutter 12 adapted for opening and closing the aperture 11. The shutter 12 is formed as a unitary body by e.g., injection molding a resin material, such as a plastic, and is dimensioned to close the aperture 11 formed in the obliquely extending direction. The shutter 12 is mounted for movement along a lateral sidewall section **4*c* of the main cartridge body 4 extending parallel to the direction indicated by arrow A in FIG. 4**.

Figure 8:
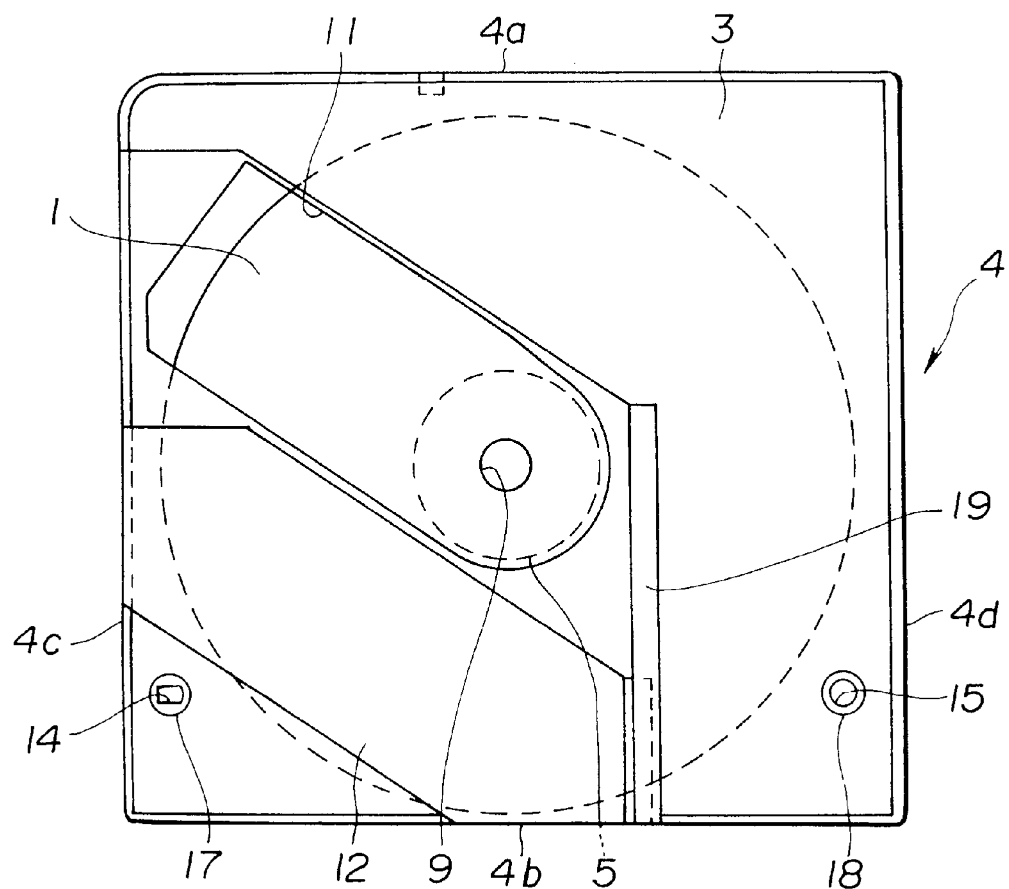
FIG. 8 is a bottom view showing the shutter in its opened position on the disc cartridge of FIG. 3.

That is, the shutter 12 is configured to be movable between a closed position covering the aperture 11 shown in FIG. 4 and an opened position exposing the aperture 11 and thereby exposing the recording disc 1 to the outside, as shown in FIG. 8. For moving the shutter 12, the shutter 12 has its one lateral side retained by a shutter retainer 19 provided in the lower cartridge half 3 in order to assure stabilized shutter movement.

The disc cartridge carrying the shutter 12 has its sidewall sections **4*c* and 4*d* extending parallel to the cartridge inserting direction formed with different cross-sectional shapes (FIG. 6) for prohibiting erroneous insertion of the disc cartridge into the inside of the recording/reproducing apparatus. That is, the sidewall section 4*c* along which the shutter 12 is slidable is provided with an outwardly convex, sharply arcuate form, while the opposite sidewall section 4*d*** is of a substantially orthogonally angled U-shaped cross-section.

Figure 11:
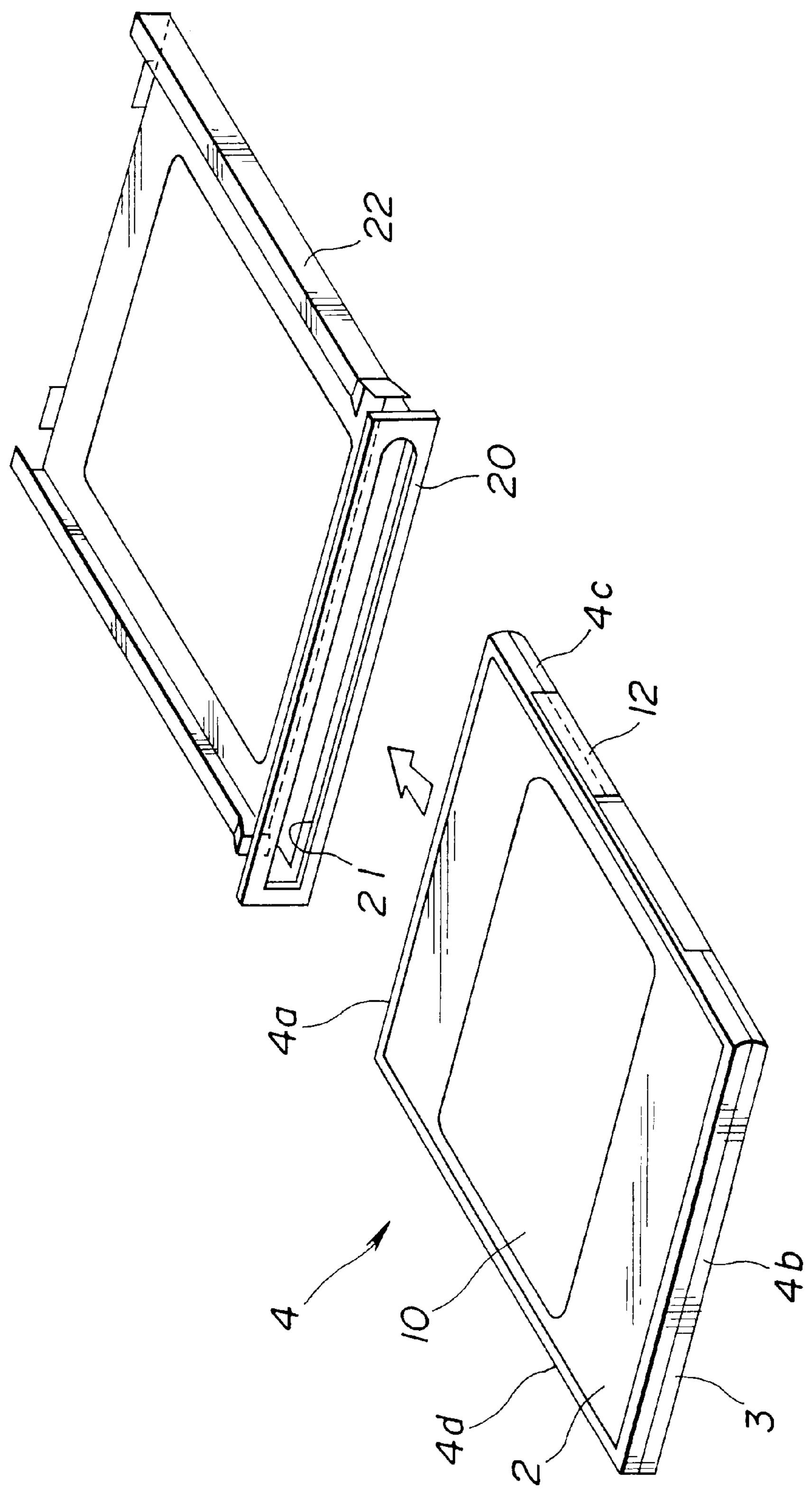
FIG. 11 is a perspective view showing the introduction of the disc cartridge of FIG. 3 into a cartridge holder.

Correspondingly, as shown on FIG. 11, the opening shape of a disc cartridge insertion opening 21 provided in a front panel 20 on the front side of the recording/reproducing apparatus is substantially of the same shape as the transverse cross-section of the disc cartridge in the normal inserting direction. Thus, when the disc cartridge is introduced into the disc cartridge inserting opening 21 in the normal direction, the disc cartridge is held within a cartridge holder 22 provided within the recording/reproducing apparatus. Conversely, if the disc cartridge is about to be introduced in the inverted or topsy-turvied position, the main cartridge body 4 collides against the rim of the opening edge of the disc cartridge inserting opening 21 and cannot be introduced further thus achieving the prevention of mistaken insertion.

Similar effects may be achieved by providing another similarly contoured disc cartridge inserting opening having differently shaped ends in the cartridge holder 22.

Since the mistaken insertion of the disc cartridge into the recording/reproducing apparatus is prohibited by the outer shape of the disc cartridge, there is no necessity of providing a groove for prevention of mistaken insertion in the sidewall section of the cartridge main body 4. This increases the degree of designing freedom for the upper and lower cartridge halves 2, 3 and facilitates metal mold designing while preventing the occurrence of troubles caused e.g. by the moving parts being caught by the grooves during the insertion of the disc cartridge. While the above description has been made of a single-sided disc, the double-sided disc may also be handled if the rectangular-shaped disc cartridge inserting opening 21 of the front panel 20 is used and a switch or a photosensor is provided at a position registering with the both sidewall sections of the disc cartridge for enabling discrimination between the front and back sides of the disc.

Figure 12:
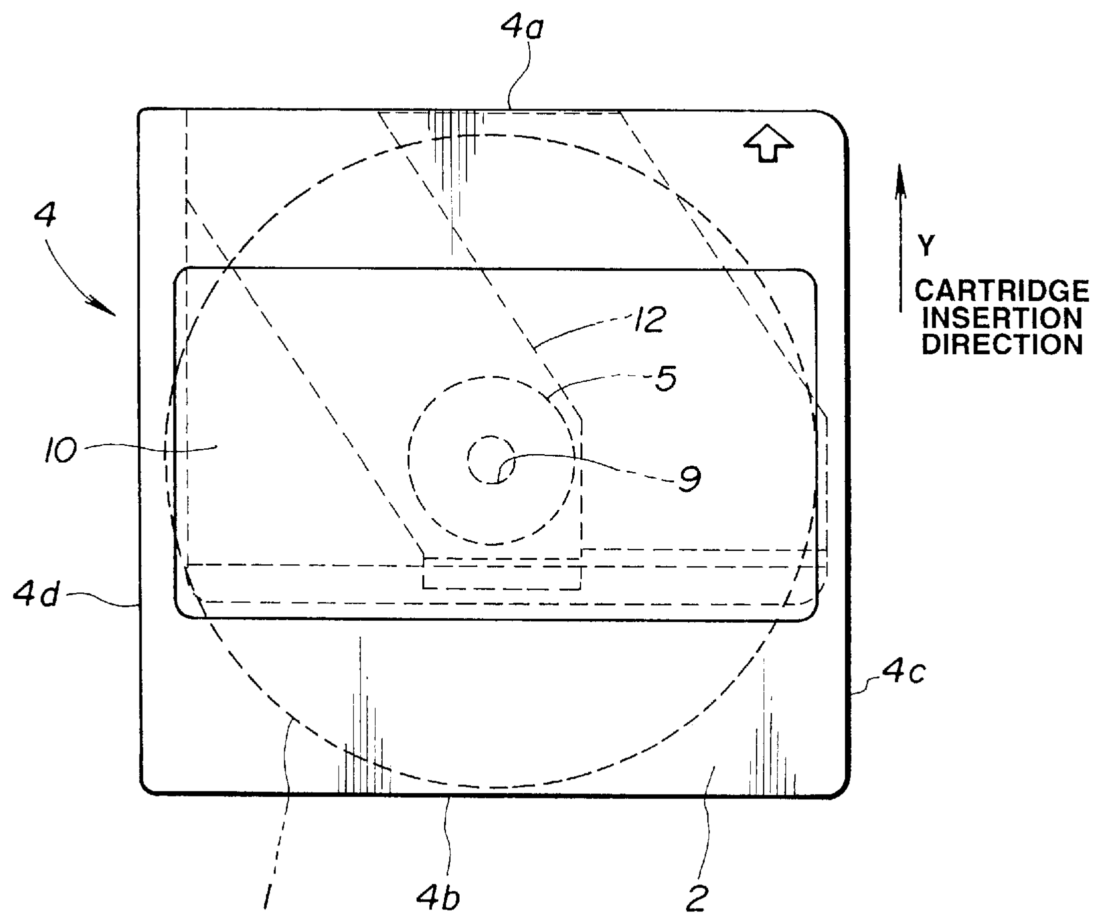
FIG. 12 is a plan view showing a disc cartridge according to another embodiment of the invention and in which the shutter is adapted to be slid in a direction perpendicular to the disc cartridge inserting direction and showing the shutter in its closed position.
Figure 13:
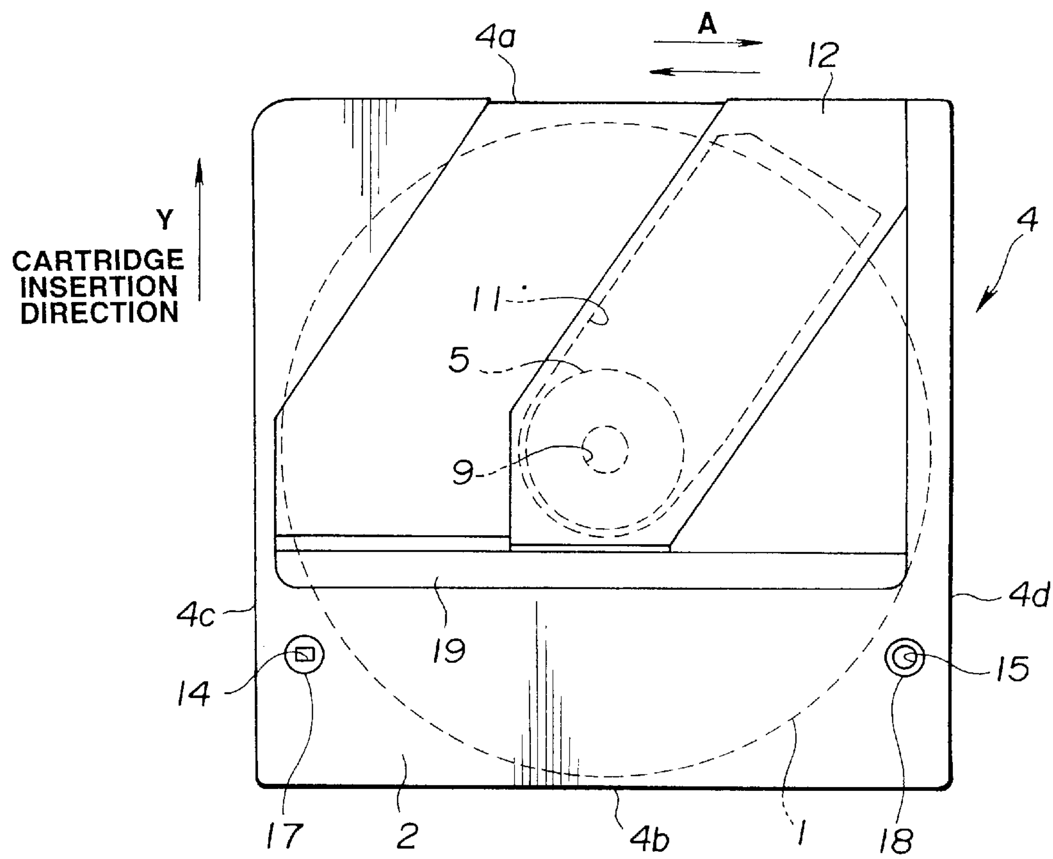
FIG. 13 is a bottom view showing the disc cartridge of FIG. 12 with its shutter in the closed position.
Figure 14:
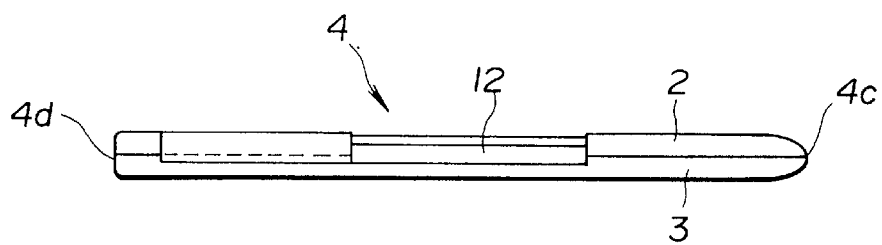
FIG. 14 is a front view showing the disc cartridge of FIG. 12 with its shutter in the closed position.
Figure 15:
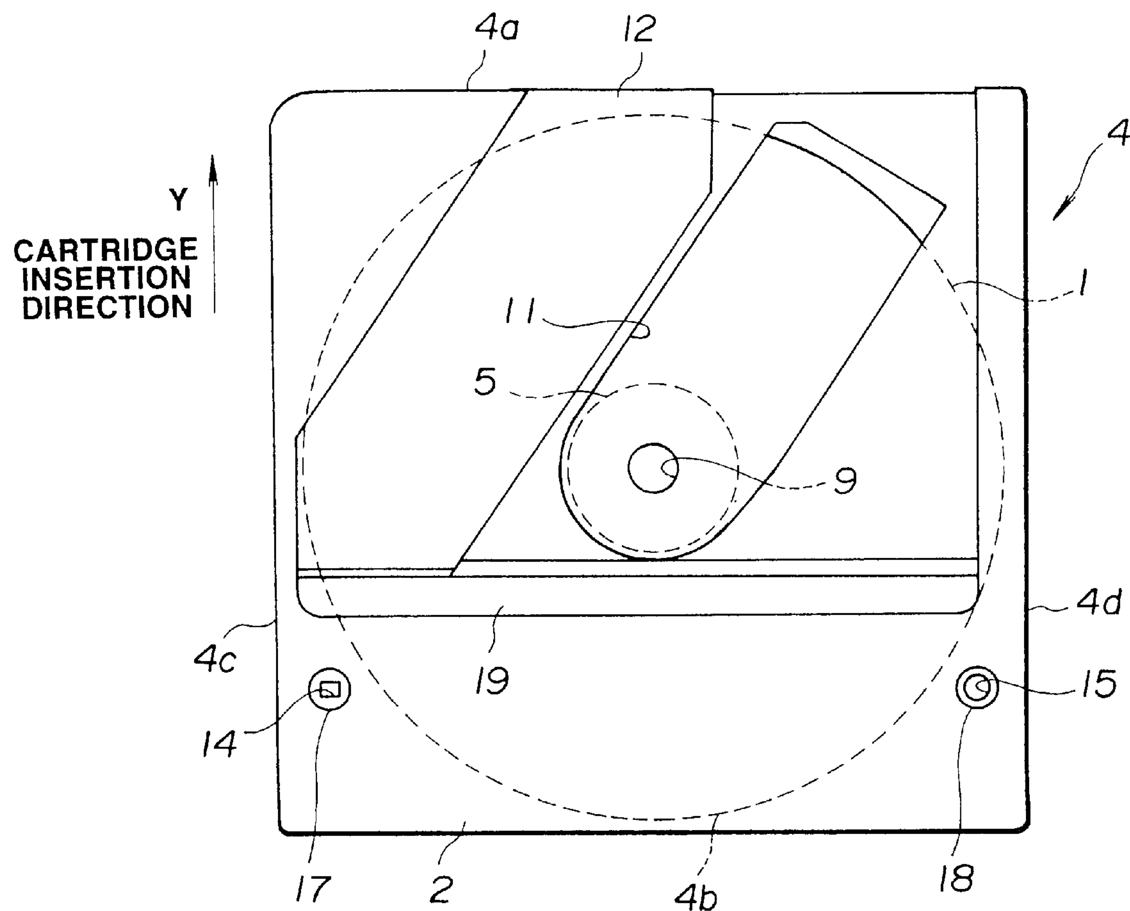
FIG. 15 is a bottom view showing the disc cartridge of FIG. 12, but showing the shutter in its opened position.
Figure 16:
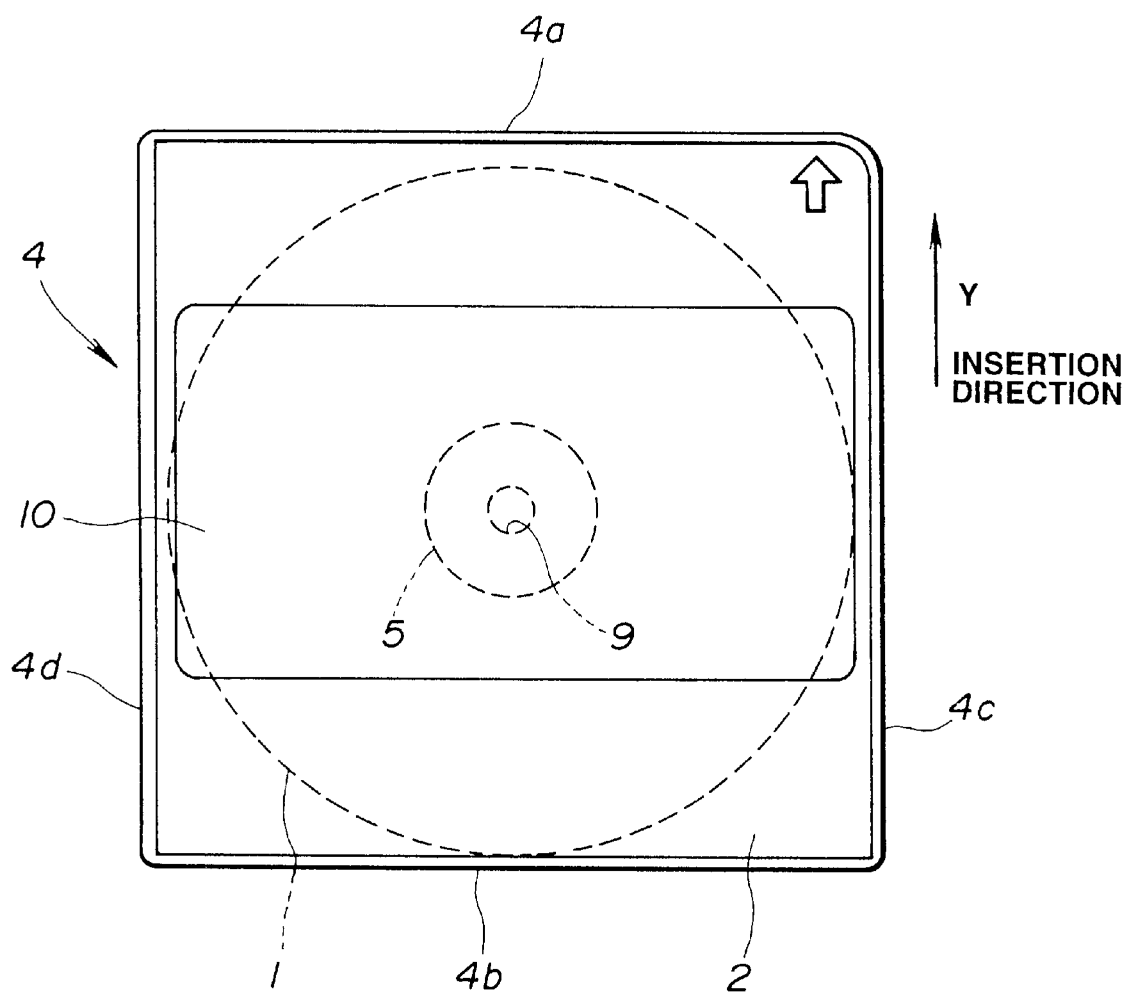
FIG. 16 is a top plan view of a disc cartridge according to another embodiment of the invention.

While the foregoing description has been made of a disc cartridge in which the shutter 12 is movable in a direction A parallel to the direction of insertion Y of the disc cartridge, similar effects may also be achieved by mounting the shutter 12 for movement in a direction perpendicular to the cartridge inserting direction Y. That is, as shown in FIGS. 12 and 15, the shutter 12 is rotated 90° towards left and the shutter 12 is configured to be slidable in a direction perpendicular to the cartridge inserting direction, that is in a direction shown by arrow A in FIG. 13. The construction of the disc cartridge is otherwise the same as that of the previously described disc cartridge.

A second embodiment of the disc cartridge is now explained. The disc cartridge of the present second embodiment employs a shutter which is substantially V-shaped in plan configuration. In the present disc cartridge, the parts or components which are similar to those of the first embodiment are denoted by the same numerals and the corresponding description is omitted for clarity.

Figure 17:
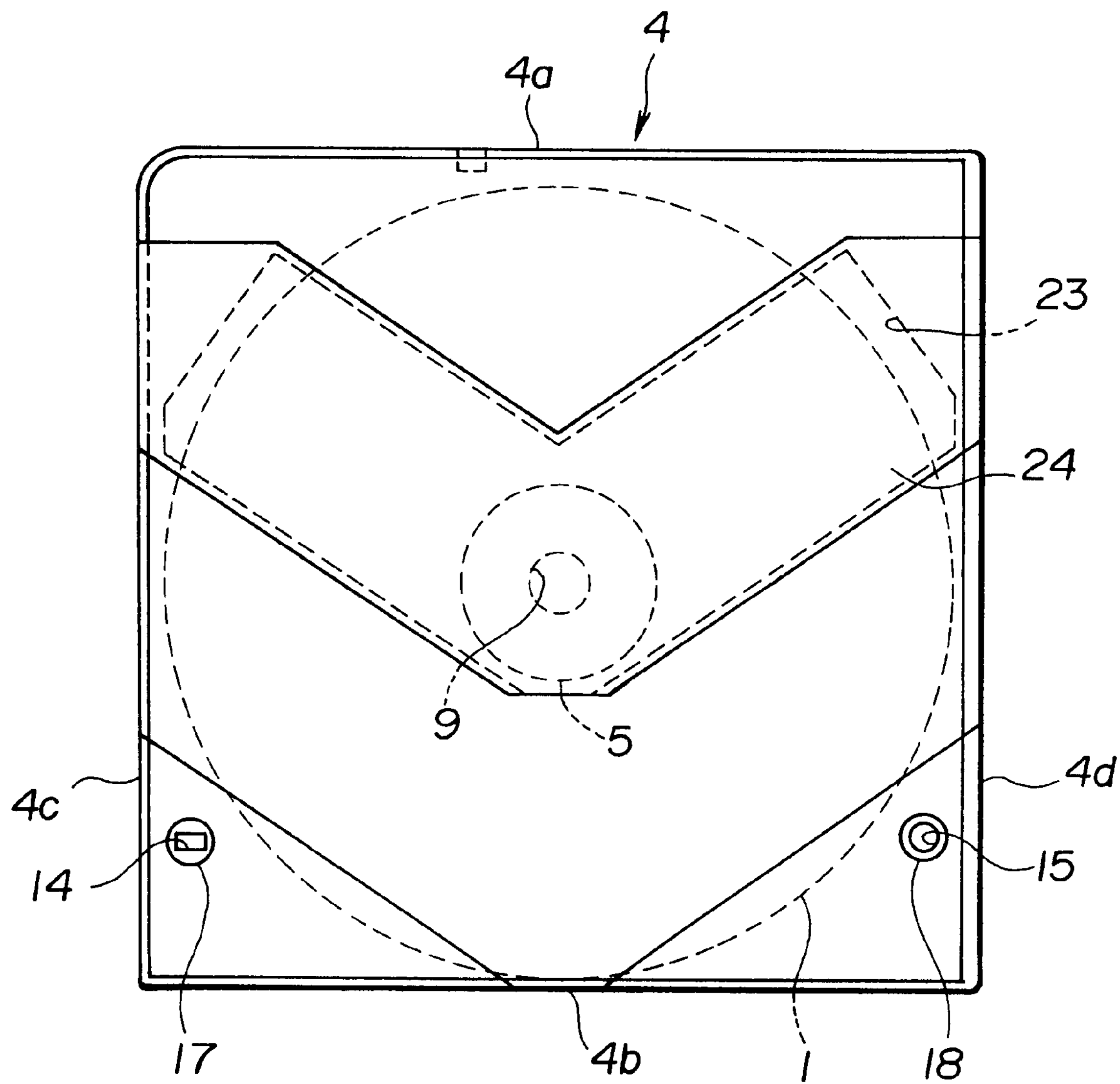
FIG. 17 is a bottom view of the disc cartridge of FIG. 16, and showing the shutter in its closed position.
Figure 18:
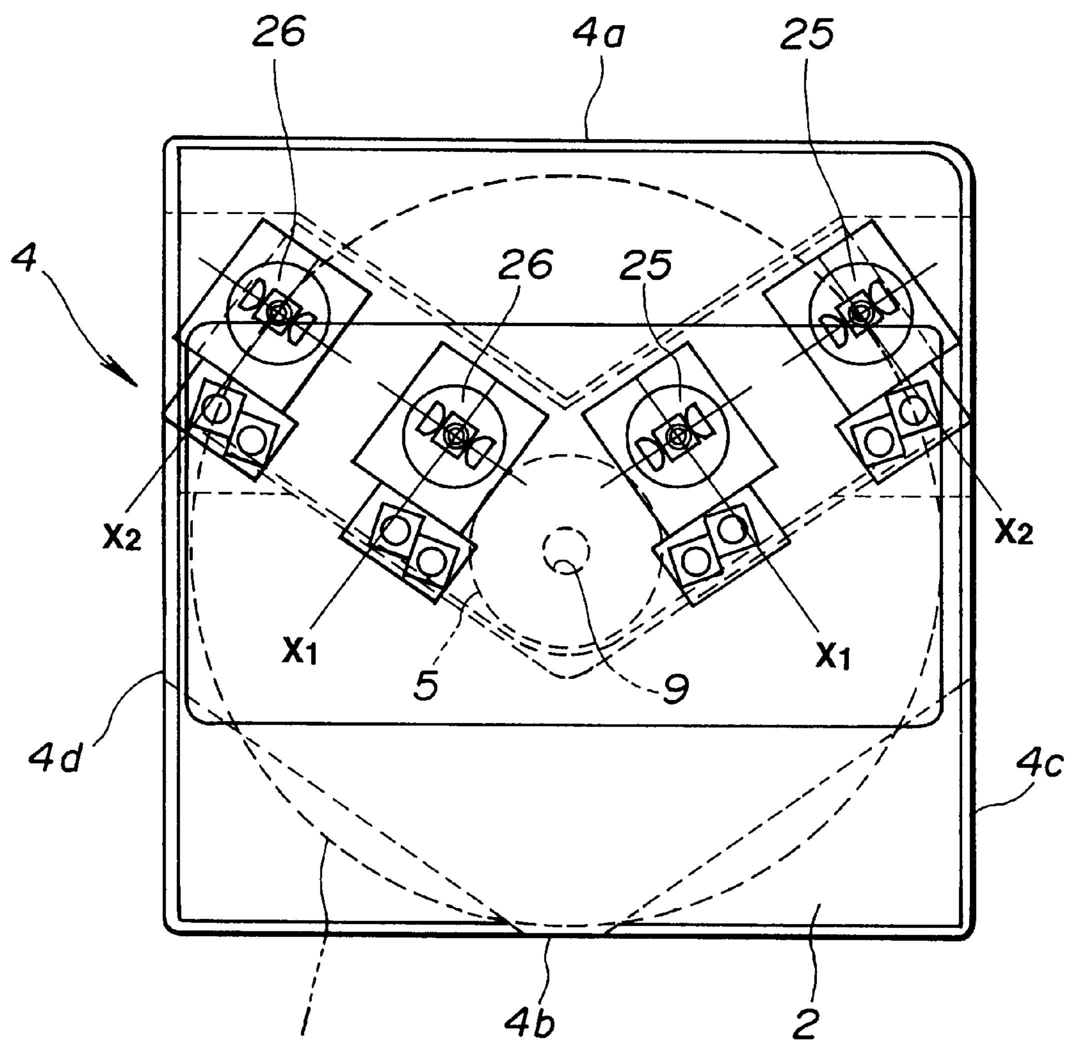
FIG. 18 is a see-through view of the disc cartridge of FIG. 16 and showing the shutter opened and optical pickup devices facing the aperture.
Figure 19:
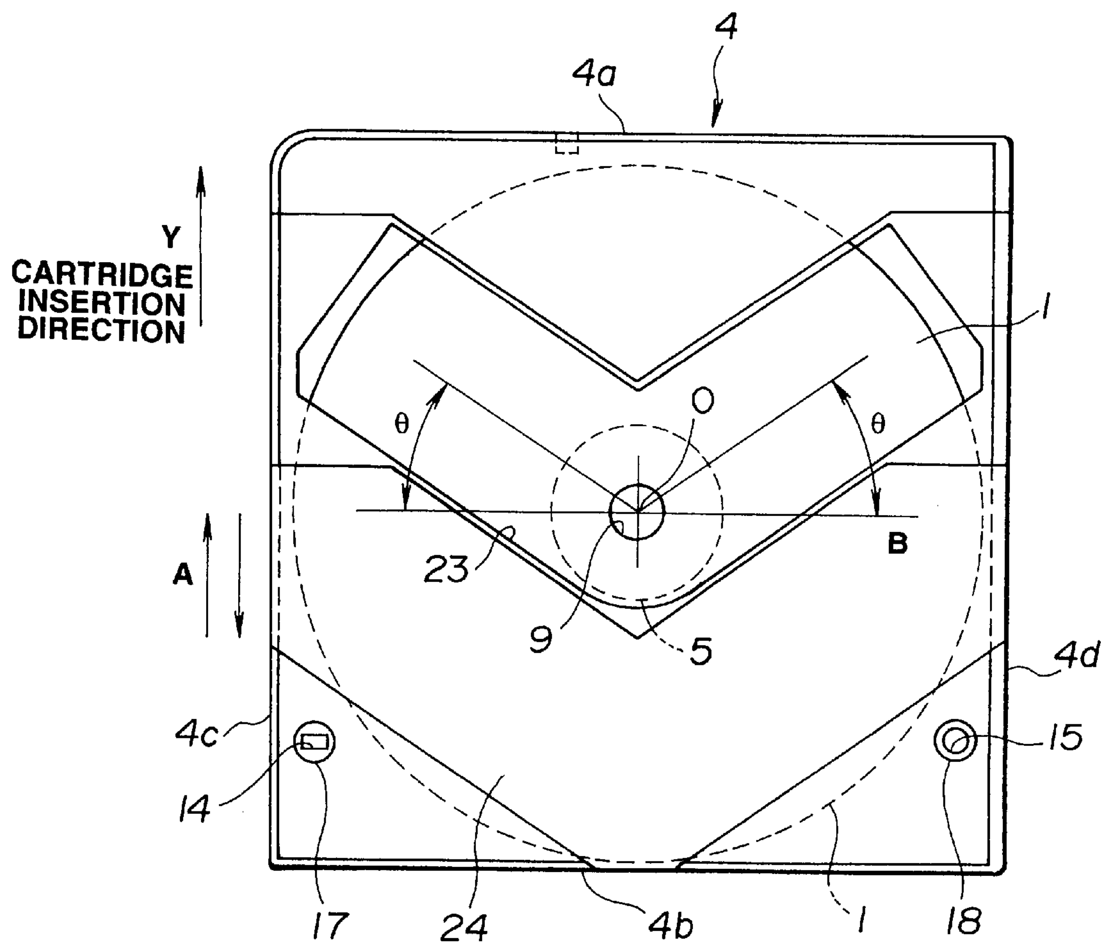
FIG. 19 is a bottom view similar to that of FIG. 17, but showing the shutter in its opened position.

The present disc cartridge differs from the disc cartridge of the previous first embodiment in that, although the shape of the upper cartridge half 2 remains the same, the shape of the aperture 23 of the lower cartridge half 3 is substantially V-shaped in plan configuration, as shown in FIGS. 17 to 19. The apex portion of the V-shape of the aperture 23 is of a width sufficient to be faced by a spindle, while the aperture portions extending obliquely from the apex portion towards both lateral sides are formed as an aperture of a width sufficient to be faced by optical pickup devices 25, 26 moved between the inner and outer rim portions of the recording disc 1 (FIG. 18).

In addition, similarly to the aperture 11 of the disc cartridge of the first embodiment, the aperture portions of the V-shaped aperture 23 extending towards both lateral sides are passed through the center 0 of the recording disc 1 and inclined at an angle θ smaller than 45° with respect to a straight line B perpendicular to the direction of movement of the shutter 24, as indicated by arrow A in FIG. 19.

The V-shaped aperture 23 is configured so that it is confronted at one side of the apex portion by the recording optical pickup device 25 and, at the opposite side of the apex portion, by the reproducing optical pickup device 26, as shown in FIG. 18. That is, with the present disc cartridge, information signals are recorded by the recording optical pickup device 25 and the information signals thus recorded are immediately reproduced by the reproducing optical head device 26.

On the other hand, the shutter 24 for opening and closing the V-shaped aperture 23 is formed as a substantially flat V-shaped plate dimensioned to close the aperture 23 and is configured to be movable along both sidewall sections 4*c*, 4*d* extending parallel to the disc cartridge inserting direction Y.

Since the aperture 23 of the disc cartridge of the present embodiment is substantially planar in plan configuration and has its opposite side portions arranged obliquely relative to the side wall sections 4*c* and 4*d*, the disc cartridge itself may be reduced in size. In addition, the recording optical pickup device 25 and the reproducing optical pickup device 26 may be enclosed within the recording/reproducing apparatus for recording and reproducing information signals on or from the recording disc 1 substantially simultaneously.

A disc cartridge of a third embodiment, which will now be described, is an interchangeable disc cartridge in which recording/reproduction may be achieved with the same recording/reproducing apparatus on or from two or more disc cartridges accommodating recording discs of different diameters. In such disc cartridge according to the third embodiment, there is provided an obliquely extending aperture which may be opened and closed by two shutters.

Figure 20:
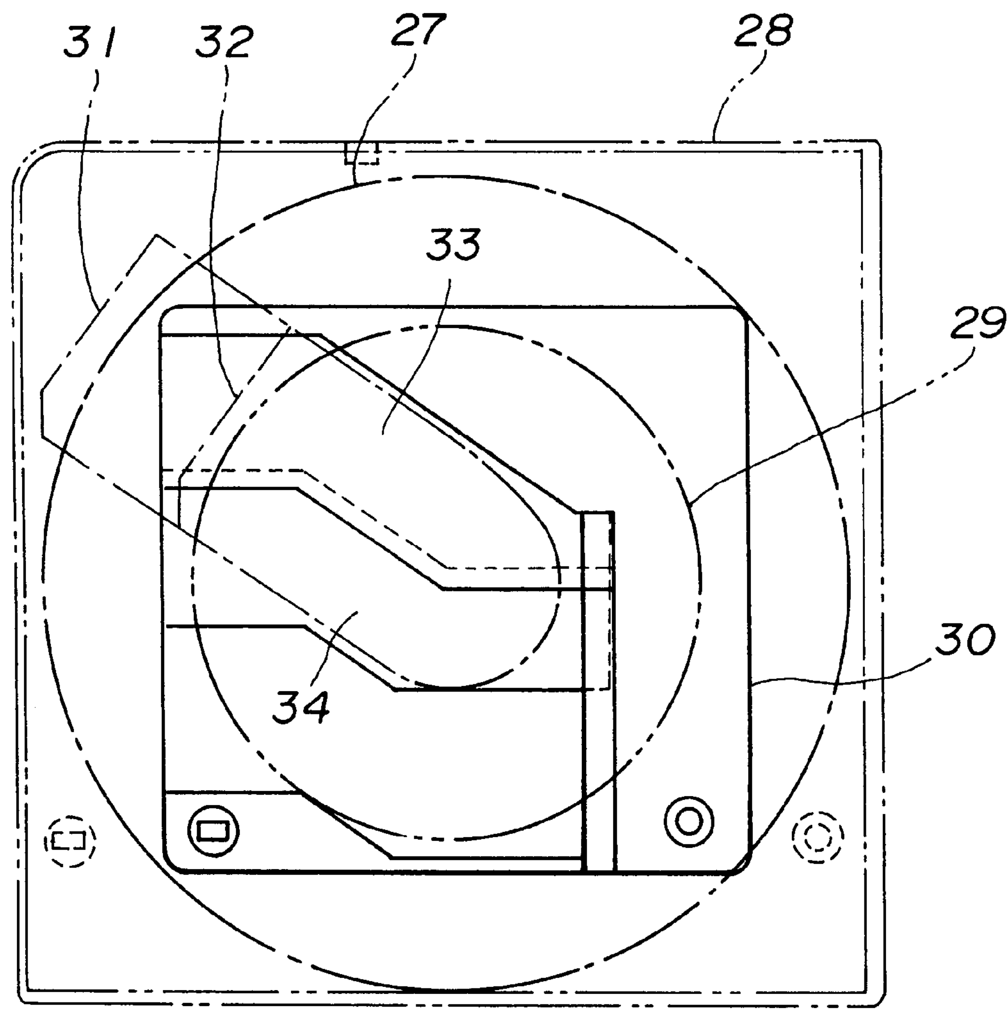
FIG. 20 is a plan view illustrating a disc cartridge according to still another, and in which a disc cartridge housing a large-diameter disc and another disc cartridge housing a small-diameter disc are configured for information recording and/or reproduction using a common recording/reproducing apparatus.

More particularly, FIG. 20 shows a first disc cartridge 28 (indicated in dot dash Lines) accommodating a recording disc 27 with a diameter of 120 mm and a second disc cartridge 30 (indicated in full lines) accommodating another recording disc 29 with a diameter of 80 mm. The disc cartridge 28 has an aperture 31 which extends obliquely on a substantially diagonal line of the main cartridge body under the same conditions as those of the disc cartridge 4 according to the first embodiment. The disc cartridge 30 also has an aperture 32 of the same width and at the same position as the aperture 31 of the disc cartridge 28, but with the length of the aperture 32 being correspondingly smaller than the length of the aperture 31.

If, with the second disc cartridge 30 having an outer size smaller than the first disc cartridge 28, the aperture 32 is opened or closed by a single shutter dimensioned to close the aperture 32, the amount of shutter displacement has to be so large as to move the shutter outside the main cartridge body. Thus, in accordance with the third embodiment of the invention, the shutter is constituted by two shutters 33, 34, arranged so that the shutter need not be moved outside the main cartridge body and also for reducing the amount of shutter displacement.

Figure 21:
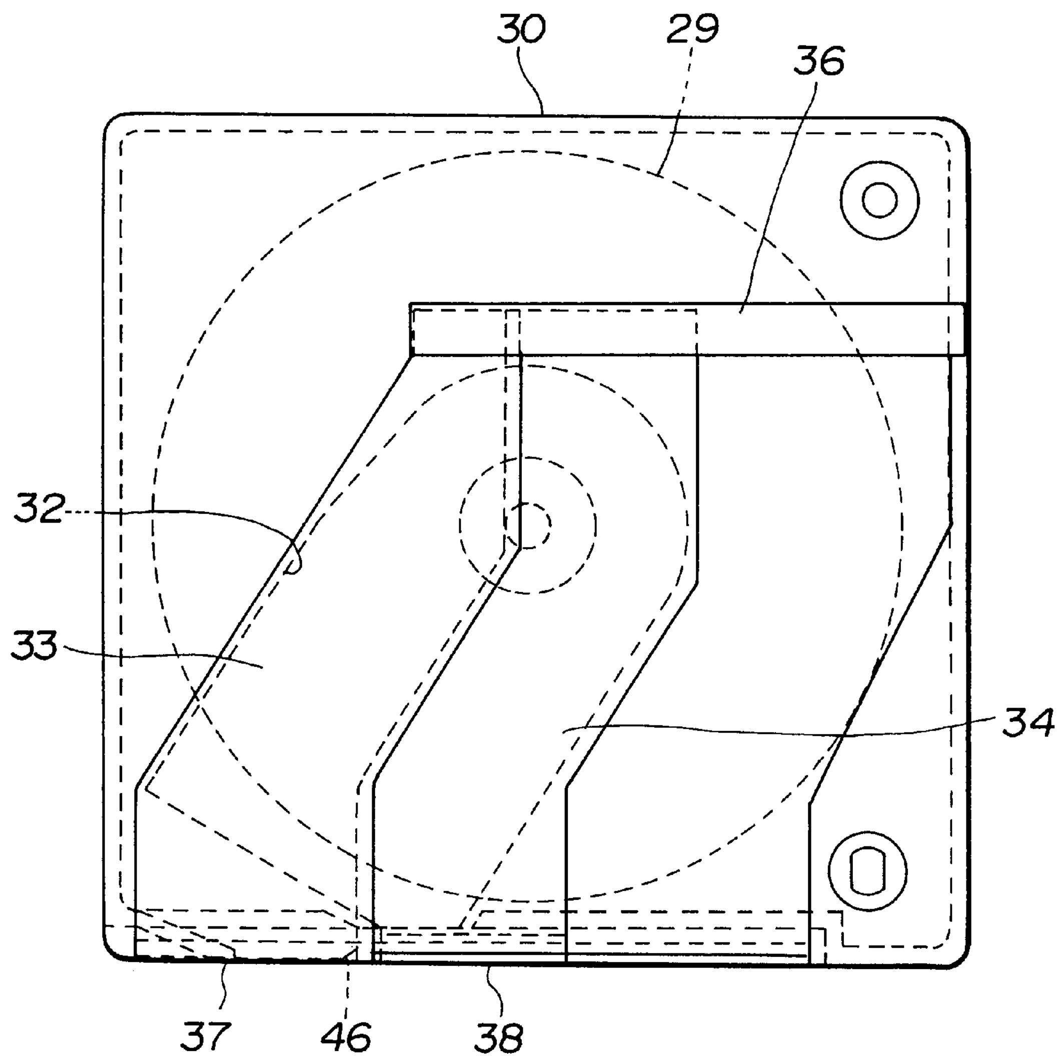
FIG. 21 is a bottom view showing the relatively small-size disc cartridge of FIG. 20 with a shutter assembly thereof in its closed condition.

The first shutter 33 and the second shutter 34 are dimensioned to conjointly close the aperture 32 as shown in FIG. 21 illustrating the closed state of the aperture 32. The second shutter 34 is positioned under the first shutter 33, that is towards the disc 29, and is partially overlapped with the first shutter.

Figure 22:
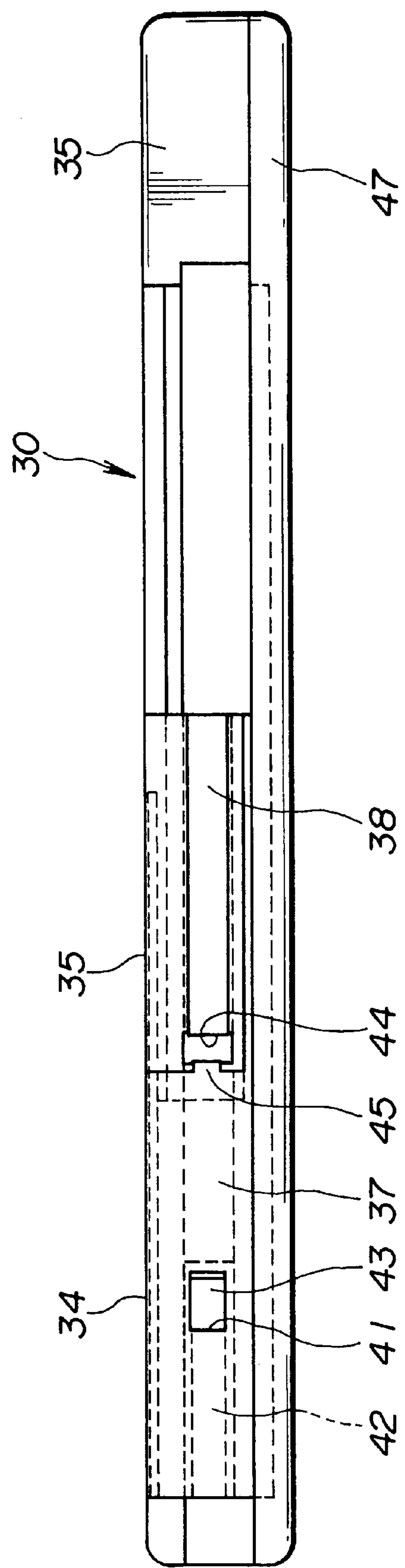
FIG. 22 is a side view of the disc cartridge of FIG. 21 with its shutter assembly in the closed condition.
Figure 23:
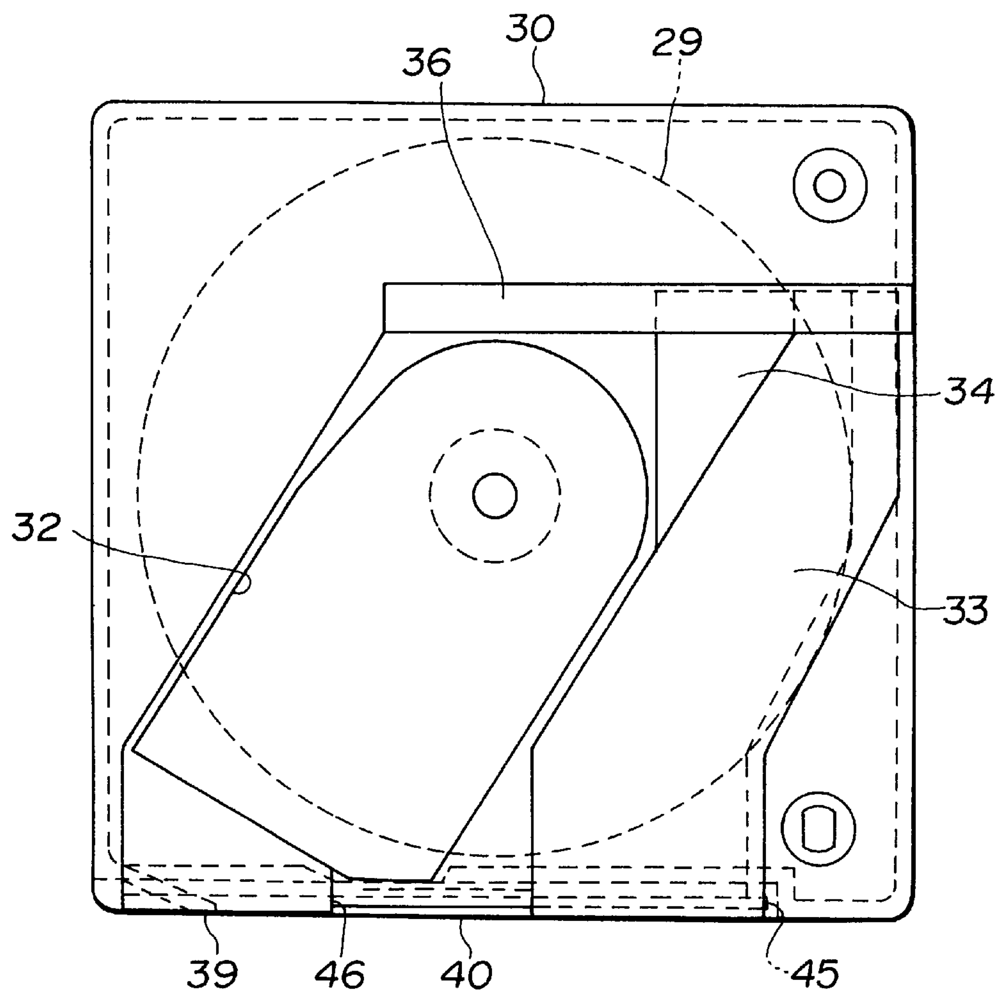
FIG. 23 is a bottom view showing the disc cartridge of FIG. 21, but with its shutter assembly in its opened condition.

These shutters 33, 34 have their one ends, that is, their ends near to the center of the cartridge, retained by a shutter retainer 36 provided on the lower cartridge half 35, while having, at their opposite ends, side shutter slide portions 37, 38, bent towards the sidewall section of the disc cartridge 30, and configured for being moved along slide sections 39, 40 provided on the lower cartridge half 35, so that the shutters 33, 34 may be moved between the positions for closing the aperture 32 as shown in FIG. 21, and the positions for opening the aperture 32, as shown in FIG. 23. The shutters 33, 34 are mounted only on the lower cartridge half 35, without being engaged with the upper cartridge half 47, as shown in FIG. 22.

Figure 24:
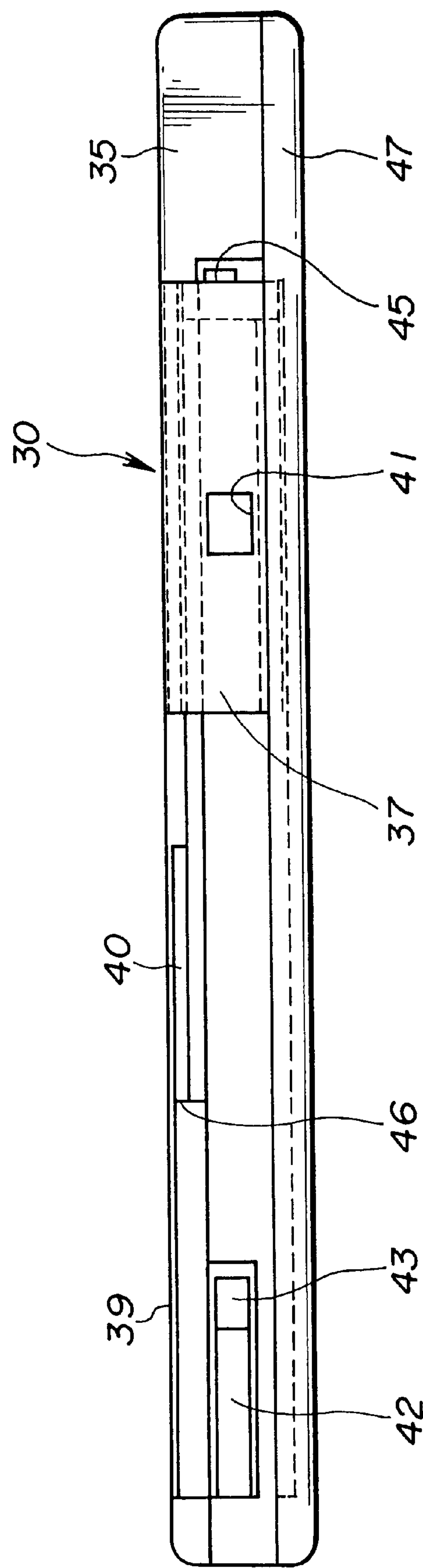
FIG. 24 is a side view similar to that of FIG. 22, but with the shutter assembly in its opened condition.

The shutter slide portion 37 of the first shutter 33 is moved along the slide section 39 provided on the sidewall section of the lower cartridge half 35 as shown in FIGS. 23 and 24. On the other hand, the shutter slide portion 38 of the second shutter 34 is moved along the slide section 40 of the lower cartridge half 35 provided at a position lower by one step than the slide section 39 along which the first shutter 33 is moved.

When the aperture 32 is closed by the shutters 33, 34, neither the first shutter 33 nor the second shutter can be moved. That is, the first shutter 33 has a shutter lock hole 41 formed as a rectangular-shaped opening in the shutter slide section 37 so that the first shutter cannot be moved in the direction of closing the aperture 32 nor in the direction of opening the aperture 32 by the engagement in the shutter lock hole 41 of a shutter lock pawl 43 of a shutter lock member 42 provided on the lower cartridge half 35 (FIG. 24).

On the other hand, the second shutter 34 has a shutter lock hole 44 which is similarly formed as a rectangular hole in the slide shutter section 38, as shown in FIG. 22. A shutter lock pawl 45 provided on the shutter slide section 37 of the first shutter 33 is intruded into the inside of the shutter lock hole 44 for inhibiting movement of the shutter in the direction of opening the aperture 32. As for shutter movement in the direction for closing the aperture 32, that is, shutter movement from the positions shown in FIGS. 23 and 24, the second shutter 34 is contacted with a step 46 (FIGS. 21 and 23) formed on the sidewall section of the lower cartridge half 35 for limiting movement of the second shutter in such direction.

With the above-described shutters 33, 34, when the disc cartridge is introduced into the inside of the recording/reproducing apparatus, the shutter lock member 42 locking the first shutter 33 is thrust toward the inside of the main cartridge body by a shutter opening member provided in the recording/reproducing apparatus for unlocking the first shutter 33. At the same time, the first shutter 33 is moved in a direction of opening the aperture 32 by the shutter opening member, and the first shutter 33 is overlapped on the second shutter 34. Ultimately, the first shutter 33 overlapped on the second shutter 34 is moved therewith for opening the aperture 32, as shown in FIG. 23.

When the disc cartridge is to be ejected from the recording/reproducing apparatus, a shutter closure member provided in the recording/reproducing apparatus is engaged in the shutter lock hole 41 provided in the first shutter 33, so that the first shutter 33 and the second shutter 34 are moved in a direction of closing the aperture 32. The shutter lock member 42 is engaged in the shutter lock hole 41 formed in the first shutter 33 for locking the first shutter 33. The second shutter 34 is contacted with the step 46 provided on the lower cartridge half 35 at the same time as the shutter lock pawl 45 is engaged in the shutter lock hole 44 for locking the second shutter 34. As a result, the aperture 32 is closed by the first shutter 33 and the second shutter 34.

Although the embodiment of FIGS. 20–24 is shown applied to a single-sided disc cartridge, similar effects may be realized with a double-sided disc cartridge having apertures and corresponding shutters in both sides, that is in the upper and lower cartridge halves.

What is claimed is:

1. A disc cartridge for use in a recording and/or reproducing apparatus having an elongated insertion opening to receive said cartridge in a predetermined normal inserting direction, with opposite end portions of said insertion opening having different configurations, said disc cartridge comprising:

a disc-shaped recording medium; and a substantially rectangular main cartridge body rotatably accommodating said recording medium and being comprised of upper and lower cartridge halves defining respective major surfaces of said body and having mating peripheral portions defining first and second pairs of parallel sidewall sections of said body which respectively extend parallel to said normal insertion direction, said parallel sidewall sections including means for prohibiting erroneous insertion of the disc cartridge wherein said first-pair of said parallel sidewall sections has a different cross-sectional configuration than said second pair respectively without providing a groove in the parallel side wall sections of said cartridge main body, said different cross-sectional configurations of said respective first and second pairs of parallel sidewall sections corresponding to said different configurations of said opposite end portions of the insertion opening so that said cartridge body is insertable in said opening only in said normal inserting direction.

2. The disc cartridge as in claim 1; wherein said cross-sectional configuration of one of said first pair of parallel sidewall sections is of outwardly convex, sharply arcuate form, and said cross-sectional configuration of the other of said first pair of parallel sidewall sections is of substantially orthogonally angled U-shaped form.

3. The disc cartridge as in claim 1; which is insertable in a recording and/or reproducing apparatus having positioning pins for establishing an operative position of the disc cartridge when inserted in said normal inserting direction, with each of said positioning pins including a shank portion and a reduced diameter end portion for defining an annular shoulder therebetween; and wherein one of said major surfaces of the main cartridge body of the disc cartridge has a hole therein for each of the positioning pins, each said hole being dimensioned to receive said reduced diameter end portion of the respective one of said pins, and said disc cartridge including means for setting a height level between said disc cartridge and said recording/reproducing apparatus, said height level setting means comprising a toroidal groove in said one major surface extending around each said hole and spaced therefrom so that, with said reduced diameter end portion of the respective positioning pin engaged in said hole, the outer margin of said annular shoulder comes within said toroidal groove for ensuring accurate positioning of said main cartridge body by engagement of said annular shoulder of each of said positioning pins with said major surface between the respective hole and said toroidal groove therearound.

4. The disc cartridge as in claim 1; wherein at least one of said major surfaces of the main cartridge body has an aperture therein for access to said disc-shaped recording medium in recording and/or reproducing signals thereon, said aperture including at least one inclined portion extending from the center of said disc-shaped recording medium substantially toward a corner of said rectangular main cartridge body; and further comprising shutter means mounted for movement along at least one of said sidewall sections of the main cartridge body between a closed position covering said aperture and an opened position uncovering said aperture, each said inclined portion of said aperture being at an angle of less than 45° from a straight line which passes through said center of the disc-shaped recording medium and which is normal to the direction of said movement of said shutter means between said closed and opened positions.

5. The disc cartridge as in claim 1; wherein said aperture is substantially V-shaped in plan configuration so as to have another inclined portion converging with said one inclined portion at said center of the disc-shaped recording medium to permit substantially simultaneous recording and reproducing of signals on the disc-shaped recording medium through said one inclined portion and said other inclined portion of the aperture.

6. The disc cartridge as in claim 1; wherein said shutter means includes first and second shutter members moveable relative to each other and relative to said main cartridge body between said closed position in which said shutter members extend substantially beyond each other for covering said aperture and said opened position in which said shutter members are in substantially overlapping relation to each other for uncovering said aperture while occupying a space on said one major surface which is smaller in extent than said aperture.

7. A disc cartridge for use in a recording and/or reproducing apparatus having positioning pins for establishing an operative position of the cartridge when inserted in the apparatus, with each of said positioning pins including a shank portion and a reduced diameter end portion for defining an annular shoulder therebetween, said disc cartridge comprising:

a disc-shaped recording medium; and a substantially rectangular main cartridge body rotatably accommodating said recording medium and being comprised of upper and lower cartridge halves defining respective major surfaces of said body, one of said major surfaces of the main cartridge body having a hole therein for each of the positioning pins, each said hole being dimensional to receive said reduced end portion of the respective one of said pins, and means for setting a height level between said disc cartridge and said recording/reproducing apparatus, said height level setting means comprising a toroidal groove in said one major surface extending around each said hole and spaced outwardly therefrom so that, with said reduced diameter end portion of the respective positioning pin engaged in said hole, the outer margin of said annular shoulder comes within said toroidal groove for ensuring accurate positioning of said main cartridge body by engagement of said annular shoulder of each of said positioning pins with said major surface between the respective hole and said toroidal groove therearound.

8. The disc cartridge as in claim 7; wherein said upper and lower cartridge halves have mating peripheral portions defining first and second pairs of parallel sidewall sections of said body which respectively extend parallel to a normal inserting direction and at right angles to said direction, at least one of said major surfaces of the main cartridge body has an aperture therein for access to said disc-shaped recording medium in recording and/or reproducing signals thereon, said aperture including at least one inclined portion extending from the center of said disc-shaped recording medium substantially toward a corner of said rectangular main cartridge body; and further comprising shutter means mounted for movement along at least one of said sidewall sections of the main cartridge body between a closed position covering said aperture and an opened position uncovering said aperture, each said inclined portion of said aperture being at an angle of less than 45° from a straight line which passes through said center of the disc-shaped recording medium and which is normal to the direction of said movement of said shutter means between said closed and opened positions.

9. The disc cartridge as in claim 8; wherein said aperture is substantially V-shaped in plan configuration so as to have another inclined portion converging with said one inclined portion at said center of the disc-shaped recording medium to permit substantially simultaneous recording and reproducing of signals on the disc-shaped recording medium through said one inclined portion and said other inclined portion of the aperture.

10. The disc cartridge as in claim 8; wherein said shutter means includes first and second shutter members moveable relative to each other and relative to said main cartridge body between said closed position in which said shutter members extend substantially beyond each other for covering said aperture and said opened position in which said shutter members are in substantially overlapping relation to each other for uncovering said aperture while occupying a space on said one major surface which is smaller in extent than said aperture.

* * * * *